US012373090B2

(12) United States Patent
Wong et al.

(10) Patent No.: US 12,373,090 B2
(45) Date of Patent: Jul. 29, 2025

(54) MODIFYING A FILE STORAGE STRUCTURE UTILIZING A MULTI-SECTION GRAPHICAL USER INTERFACE

(71) Applicant: Dropbox, Inc., San Francisco, CA (US)

(72) Inventors: Hsuan Chi Wong, Seattle, WA (US); Jennifer Lukban, Mountain House, CA (US); Mahlet Tiruneh, Kent, WA (US); Yuxin Xu, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 151 days.

(21) Appl. No.: 17/484,553

(22) Filed: Sep. 24, 2021

(65) Prior Publication Data

US 2023/0093929 A1 Mar. 30, 2023

(51) Int. Cl.
*G06F 3/0486* (2013.01)
*G06F 3/04817* (2022.01)
(Continued)

(52) U.S. Cl.
CPC ........ *G06F 3/0486* (2013.01); *G06F 3/04817* (2013.01); *G06F 3/0482* (2013.01); *G06F 16/168* (2019.01); *G06F 2203/04803* (2013.01)

(58) Field of Classification Search
CPC .............. G06F 3/0486; G06F 3/04817; G06F 2203/04803
See application file for complete search history.

(56) References Cited

U.S. PATENT DOCUMENTS 6,278,497 B1 8/2001 Sumiyoshi et al.
7,302,649 B2 11/2007 Ohnishi
(Continued)

FOREIGN PATENT DOCUMENTS

CN 107229468 A * 10/2017 .......... G06F 11/1448
CN 304834752 9/2018
(Continued)

OTHER PUBLICATIONS

Author: Sony Support Title: How to View the full path of a folder or file Date: Jul. 23, 2019 pp. 1-4 (Year: 2019).*
(Continued)

*Primary Examiner* — Irete F Ehichioya
*Assistant Examiner* — Phoebe X Pan
(74) *Attorney, Agent, or Firm* — Keller Preece PLLC

(57) ABSTRACT

This disclosure describes embodiments of systems, methods, and non-transitory computer readable storage media that can display icons for target digital content items and candidate destination folders within different sections of a multi-section graphical user interface (GUI) and adjust a corresponding file storage structure to reflect organization changes indicated by user interactions that move digital-content-items icons into folder icons. For example, the disclosed system can (i) display, within a first section of a multi-section GUI, icons representing digital content items and (ii) display, within a second section of the multi-section GUI, icons representing folders as candidate destination folders. Then, the disclosed systems can detect user interactions that move digital-content-item icons to folder icons and adjust an underlying file storage structure to reflect the organization indicated by the user interaction.

20 Claims, 17 Drawing Sheets

(51) Int. Cl.
  *G06F 3/0482* (2013.01)
  *G06F 16/16* (2019.01)

(56) References Cited

U.S. PATENT DOCUMENTS

| | | | |
|---|---|---|---|
| D592,219 S | 5/2009 | Agarwal et al. | |
| 9,495,070 B2* | 11/2016 | Pennington | G06F 3/0482 |
| 9,535,600 B2* | 1/2017 | Lee | G06F 3/04883 |
| 9,633,125 B1 | 4/2017 | Garcia et al. | |
| 9,715,277 B2 | 7/2017 | Lee et al. | |
| D801,997 S | 11/2017 | Kim et al. | |
| 9,813,611 B2 | 11/2017 | Petrescu et al. | |
| D823,338 S | 7/2018 | Alonso Ruiz et al. | |
| D843,396 S | 3/2019 | Lim | |
| D850,478 S | 6/2019 | Kim et al. | |
| D866,579 S | 11/2019 | Kwon | |
| D870,125 S | 12/2019 | Shim et al. | |
| D870,130 S | 12/2019 | Jang et al. | |
| D872,127 S | 1/2020 | Alonso Ruiz et al. | |
| D876,483 S | 2/2020 | Jeon | |
| D883,309 S | 5/2020 | Kim et al. | |
| D884,728 S | 5/2020 | Chaudhri et al. | |
| D910,060 S | 2/2021 | Kim | |
| D910,698 S | 2/2021 | Alonso Ruiz et al. | |
| D915,421 S | 4/2021 | Pracht et al. | |
| D921,023 S | 6/2021 | Kwon | |
| D921,694 S | 6/2021 | Alonso Ruiz et al. | |
| D922,399 S | 6/2021 | Desai et al. | |
| 11,061,553 B1 | 7/2021 | Villars | |
| D934,882 S | 11/2021 | Carlet | |
| D949,193 S | 4/2022 | Kim et al. | |
| D952,672 S | 5/2022 | Ashenden et al. | |
| D967,161 S | 10/2022 | Lim et al. | |
| D967,162 S | 10/2022 | Lim et al. | |
| D967,163 S | 10/2022 | Lim et al. | |
| D973,715 S | 12/2022 | Kim | |
| D974,410 S | 1/2023 | Kim | |
| D976,272 S | 1/2023 | Lim et al. | |
| D1,003,318 S | 10/2023 | Lim et al. | |
| D1,056,945 S | 1/2025 | Roberts et al. | |
| 2003/0160815 A1 | 8/2003 | Muschetto | |
| 2004/0004638 A1* | 1/2004 | Babaria | G06F 3/0481 715/805 |
| 2004/0044723 A1* | 3/2004 | Bell | H04L 67/06 709/203 |
| 2005/0091275 A1* | 4/2005 | Burges | G06F 16/40 |
| 2006/0036568 A1* | 2/2006 | Moore | G06F 16/168 |
| 2006/0129945 A1* | 6/2006 | Dettinger | G06F 9/451 715/769 |
| 2006/0184966 A1 | 8/2006 | Hunleth et al. | |
| 2006/0206821 A1* | 9/2006 | Chien | G06F 16/10 715/764 |
| 2007/0152058 A1 | 7/2007 | Yeakley et al. | |
| 2008/0235609 A1* | 9/2008 | Carraher | G06F 3/0486 715/769 |
| 2009/0172041 A1* | 7/2009 | Clarke | G06F 16/172 |
| 2009/0172598 A1 | 7/2009 | Yamanaka et al. | |
| 2010/0262595 A1* | 10/2010 | Park | G06F 16/156 707/769 |
| 2011/0231852 A1* | 9/2011 | Gokhale | G06F 3/0601 718/102 |
| 2011/0252372 A1* | 10/2011 | Chaudhri | H04N 7/15 715/835 |
| 2012/0030378 A1* | 2/2012 | Kaila | G06F 16/273 709/248 |
| 2012/0192118 A1 | 7/2012 | Migos et al. | |
| 2013/0055127 A1* | 2/2013 | Saito | G06F 16/168 715/810 |
| 2013/0067377 A1 | 3/2013 | Rogers | |
| 2013/0198193 A1* | 8/2013 | Chitiveli | G06F 16/353 707/E17.089 |
| 2013/0239049 A1* | 9/2013 | Perrodin | H04N 1/00453 715/781 |
| 2014/0075354 A1* | 3/2014 | Ko | G06F 3/0486 715/769 |
| 2014/0218372 A1 | 8/2014 | Missig et al. | |
| 2015/0081369 A1* | 3/2015 | Sarrazin | G06Q 10/107 705/7.18 |
| 2015/0154935 A1 | 6/2015 | Won | |
| 2015/0378592 A1 | 12/2015 | Kim | |
| 2016/0028796 A1* | 1/2016 | Garcia | H04L 67/06 715/738 |
| 2016/0224548 A1* | 8/2016 | Massand | G06F 16/93 |
| 2016/0267103 A1* | 9/2016 | Slik | G06F 16/185 |
| 2016/0350327 A1* | 12/2016 | Fan | G06F 16/16 |
| 2016/0364107 A1 | 12/2016 | Yim et al. | |
| 2017/0046012 A1 | 2/2017 | Han et al. | |
| 2017/0109011 A1 | 4/2017 | Jiang | |
| 2017/0124170 A1 | 5/2017 | Koorapati et al. | |
| 2018/0107676 A1 | 4/2018 | Vora | |
| 2018/0335939 A1 | 11/2018 | Karunamuni et al. | |
| 2019/0114330 A1* | 4/2019 | Xu | G06F 16/1774 |
| 2019/0332231 A1 | 10/2019 | Rogers et al. | |
| 2019/0332687 A1 | 10/2019 | Wilf et al. | |
| 2019/0370299 A1 | 12/2019 | Owens | |
| 2020/0183888 A1* | 6/2020 | Sawyer | G06F 11/3006 |
| 2020/0341623 A1* | 10/2020 | Yin | G06F 3/0486 |
| 2021/0081371 A1* | 3/2021 | Besen | G06F 16/178 |
| 2021/0286763 A1* | 9/2021 | Lee | G06F 40/284 |
| 2021/0350325 A1 | 11/2021 | Holden et al. | |
| 2021/0382893 A1 | 12/2021 | Kumar et al. | |
| 2022/0326825 A1 | 10/2022 | Niu | |
| 2022/0335406 A1 | 10/2022 | Xu et al. | |
| 2023/0146478 A1 | 5/2023 | You et al. | |
| 2023/0164262 A1 | 5/2023 | Yoon et al. | |
| 2023/0188637 A1 | 6/2023 | Cheon et al. | |
| 2023/0342002 A1 | 10/2023 | Zhang et al. | |
| 2023/0394466 A1 | 12/2023 | Mancuso et al. | |
| 2023/0394470 A1 | 12/2023 | Mancuso et al. | |
| 2024/0061549 A1 | 2/2024 | Chen et al. | |
| 2024/0103710 A1 | 3/2024 | Xiang | |
| 2024/0193207 A1 | 6/2024 | Seyed Fathi et al. | |
| 2024/0414250 A1 | 12/2024 | Park et al. | |

FOREIGN PATENT DOCUMENTS

| | | |
|---|---|---|
| CN | 305172822 | 5/2019 |
| CN | 307521879 | 8/2022 |

OTHER PUBLICATIONS

Akbar M., et al., "Frequent Pattern-Growth Approach for Document Organization," DBLP, Proceedings of the 2nd International Workshop on Ontologies and Information Systems for the Semantic Web, ONISW 2008, Retrieved from https://www.researchgate.net/publication/221613543_Frequent_pattern-growth_approach_for_document_organization, 2008, 10 pages.

Beets S., et al., "Managing Personal Information across Multiple Devices: Challenges and Opportunities," IFIP International Federation for Information Processing, INTERACT 2013, Part I, LNCS 8117, 2013, pp. 185-192.

Bergman O., et al., "How Do We Find Personal Files ?: The Effect of OS, Presentation & Depth on File Navigation," Proceedings of the SIGCHI Conference on Human Factors in Computing Systems, May 2012, 4 pages.

Bergman O., et al., "Personal Information Retrieval: Smartphones vs. Computers, Emails Vs. Files," Personal and Ubiquitous Computing, vol. 22, Retrieved from https://link.springer.com/article/10.1007/s00779-017-1101-6, 2017, 15 pages.

Brudy F., et al., "Cross-Device Taxonomy: Survey, Opportunities and Challenges of Interactions Spanning Across Multiple Devices," Retrieved from https://doi.org/10.1145/3290605.3300792, Proceedings of the 2019 CHI Conference on Human Factors in Computing Systems, May 2019, 28 pages.

Di Geronimo L., et al., "Surveying Personal Device Ecosystems with Cross-Device Applications in Mind," Proceedings of the 5th ACM International Symposium on Pervasive Displays, Abstract, Retrieved from https://doi.org/10.1145/2914920.2915028, Jun. 2016, 3 pages.

(56) References Cited

OTHER PUBLICATIONS

Henderson S., "Personal Document Management Strategies," Proceedings of the 10th International Conference NZ Chapter of the ACM's Special Interest Group on Human-Computer Interaction, Abstract, Retrieved from https://dl.acm.org/doi/10.1145/1577782.1577795, Jul. 2009, 4 pages.

Massey C., et al., "PIM and Personality: What do our Personal File Systems Say About US?," Abstract, Retrieved from https://www.researchgate.net/publication/266655515_PIM_and_personality_What_do_our_personal_file_systems_say_about_us, Apr. 2014, 7 pages.

Raptis D., et al., "Continuity in Multi-Device Interaction: An Online Study," Aalborg University, Proceedings of the 9th Nordic Conference on Human-Computer Interaction: Game-Changing Design, NordiCHI 2016, Association for Computing Machinery, Retrieved from https://doi.org/10.1145/2971485.2971533, 2016, 11 pages.

Tungare M., "Mental Workload in Personal Information Management: Understanding PIM Practices Across Multiple Devices," Semantic Scholar, Retrieved from https://www.semanticscholar.org/paper/Mental-Workload-in-Personal-Information-Management%3A-Tungare/3b204edad665098562fb15dbcb1266cd4202646e, 2009, 4 pages.

Waljas M., et al., "Cross-Platform Service User Experience: A Field Study and an Initial Framework," Proceedings of the 12th Conference on Human-Computer Interaction with Mobile Devices and Services, Mobile HCI, Sep. 2010, pp. 219-228.

Non-Final Office Action from U.S. Appl. No. 29/809,070, mailed on Mar. 18, 2025, 15 pages.

Sridhar S., "Samsung Begins Rolling out One UI 3.1.1 to Galaxy Z Fold2 5G, Z Flip and Galaxy Fold Bringing Z Fold3 and Z Flip3 Features," Aug. 31, 2021, [retrieved on Mar. 3, 2025], 2 pages, Retrieved from the Internet URL: https://www.fonearena.com/blog/347502/samsung-one-ui-3-1-1-features-galaxy-z-fold2-5g-galaxy-z-flip-5g-and-galaxy-z-flip-galaxy-fold.html.

Zo3listic., "Folder Icon Folder Line Icon Stock Vector," Shutterstock, Aug. 19, 2018, [retrieved on Mar. 5, 2025], 1 Page, Retrieved from the Internet URL: https://www.shutterstock.com/image-vector/folder-icon-line-1160362375.

Zovs66., "Dropbox App is networking on macOS," Oct. 24, 2019, [retrieved on Mar. 3, 2025], 1 page, Retrieved from the Internet URL: https://discussions.apple.com/thread/250781995?sortBy=rank.

\* cited by examiner

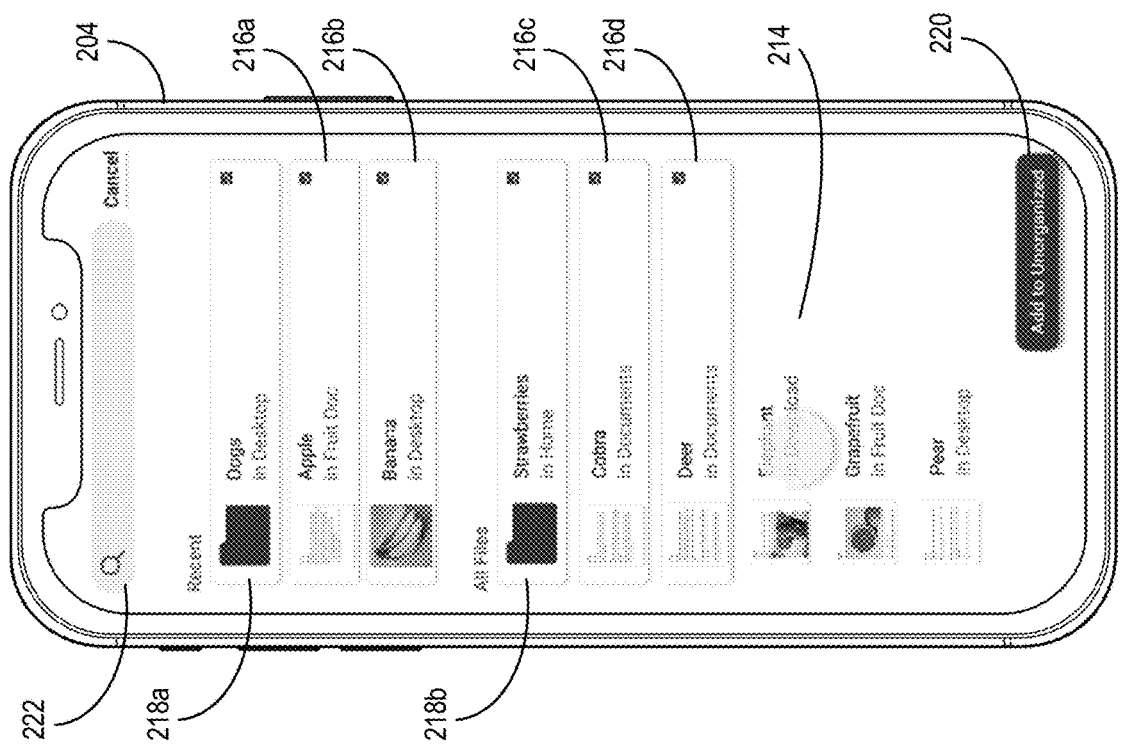
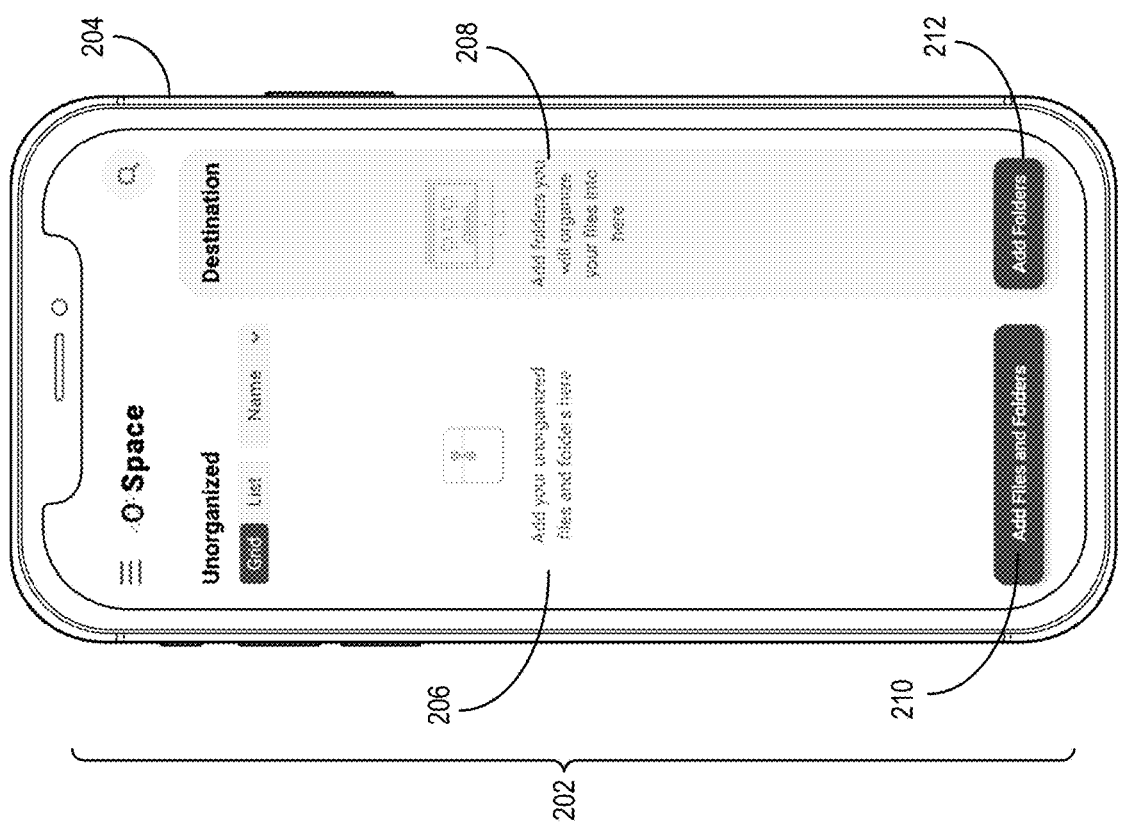
Fig. 2B
Fig. 2A

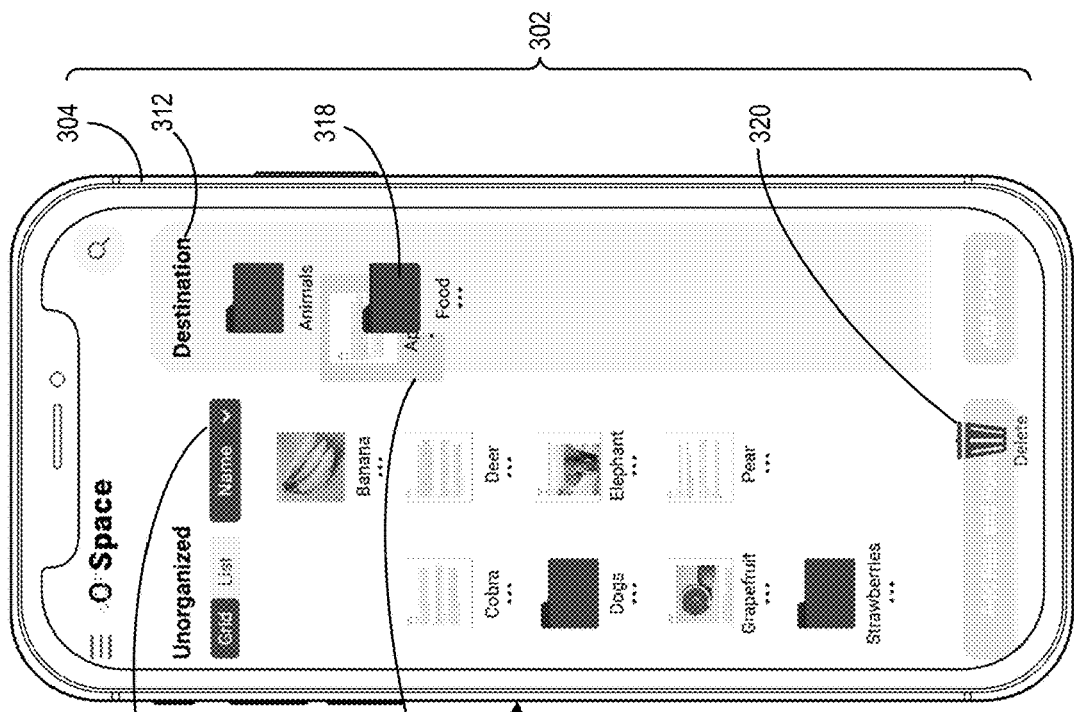
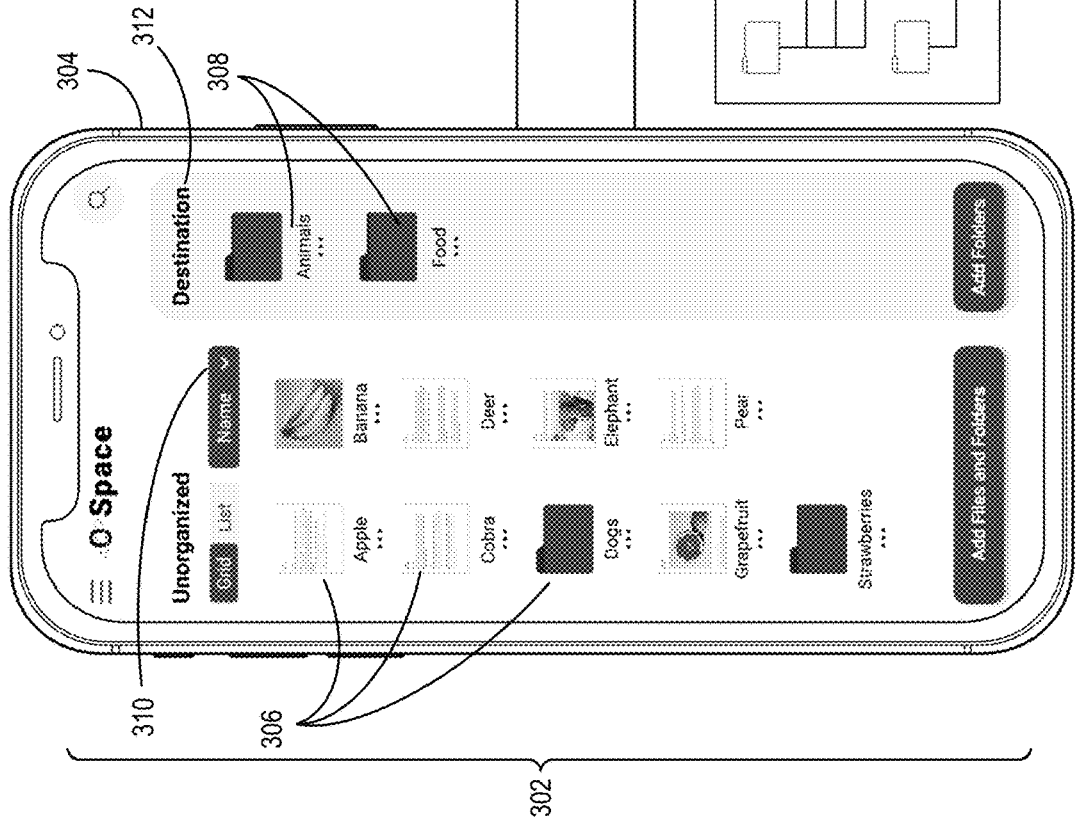
Fig. 3A
Fig. 3B

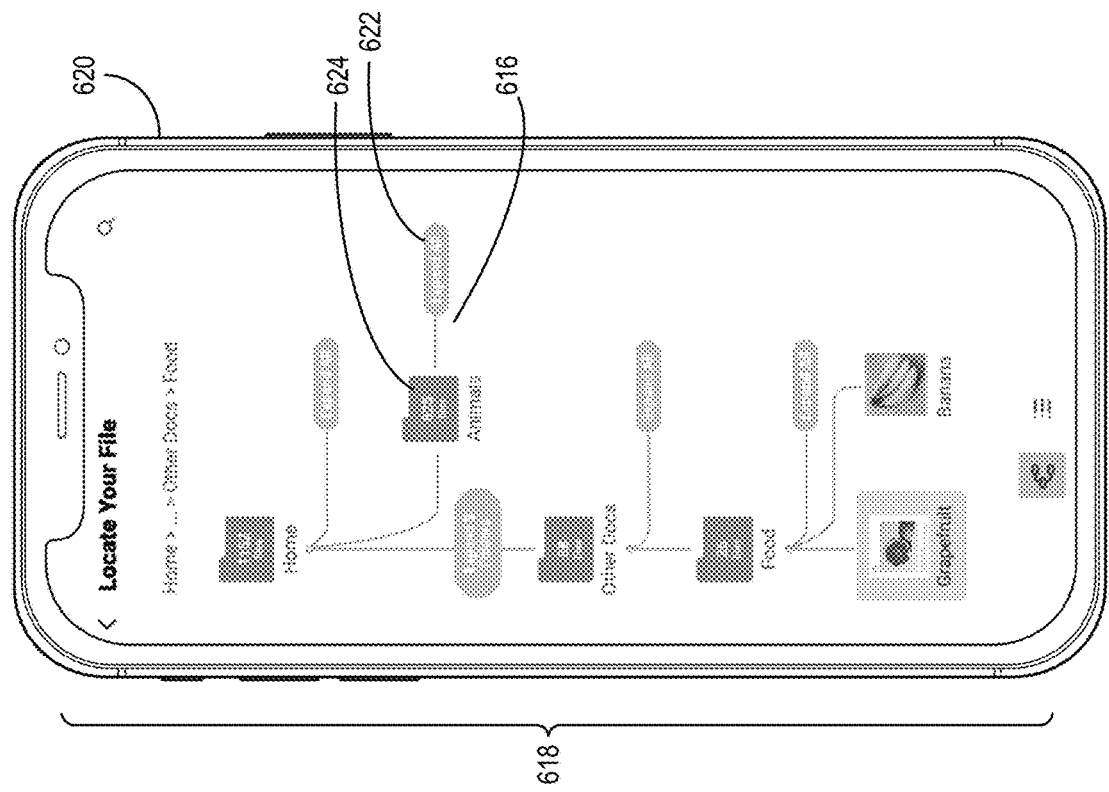
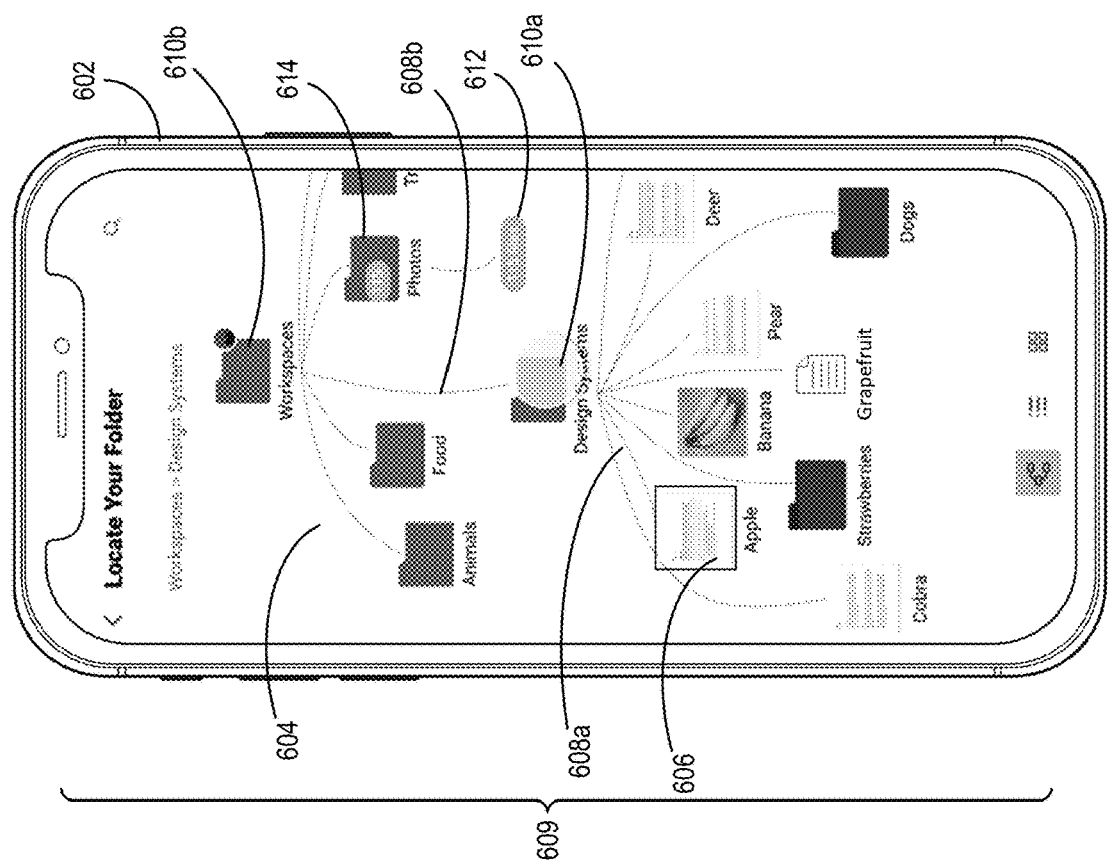

MODIFYING A FILE STORAGE STRUCTURE UTILIZING A MULTI-SECTION GRAPHICAL USER INTERFACE

BACKGROUND

In recent years, online or "cloud" storage systems have increasingly stored and managed electronic media generated via client devices. For example, some existing document hosting systems provide tools for users to create, modify, delete, and share electronic media within a document or file synchronizing environment that is accessible through mobile applications or other software applications. By providing web-based (or app-based) tools for such document and file synchronization, existing document hosting systems often provide tools for users to retrieve, view, and modify a number of electronic media that are synchronized between multiple client devices of a user.

Many such document hosting systems enable cross-device organization of electronic media through graphical user interfaces. Although such existing systems provide graphical user interfaces that facilitate the access, navigation, and retrieval of electronic media across multiple devices, these existing systems face a number of technical shortcomings. As described below, many existing systems limit graphical user interfaces (GUIs) for organizing documents to separate windows that require cumbersome navigation and menus that require multi-step inputs and multi-step navigation. By requiring user interactions to navigate and adjust separate windows and menus, the conventional GUIs of existing systems consume excessive real estate in the smaller screens of mobile devices and other computing devices for organizing and managing electronic media.

To illustrate, many existing document hosting systems provide inefficient GUIs that require numerous navigational steps to organize and manage electronic media through limited screen spaces of mobile devices and other computing devices. For example, many current systems require an inefficient number of navigational steps to select electronic media, move the electronic media, and locate a destination for the electronic media—often in the limited screen spaces of mobile or other devices. As a further example, existing document hosting systems often require devices to click through (or otherwise navigate) a hierarchy of multiple folders to find a destination for a document—often with a visualization of the folder hierarchy showing the document nested within a string of parent folders. In addition to slowing navigation, such a GUI that depicts digital content items and folders within a folder hierarchy can consume sparse real estate. To facilitate views of different parts of a folder hierarchy, some document hosting systems include separate search windows or finder windows through which a computing device can view and reorganize different folders. But such separate windows often overlap, obscure each other, and consume too much real estate in GUIs of small screens—requiring additional user interaction and navigation to incrementally adjust in size and shape.

In addition to the increased number of navigational steps, many existing document hosting systems generate inflexible and rigid GUIs that are limited in functionality. For instance, existing systems often require an inefficient number of user inputs to move or otherwise reorganize documents. To illustrate, many current systems include menus in a finder window showing a document thumbnail for a document (or a navigation bar within the document) through which a computing device can navigate to find a move option and (after selecting the move option) navigate in a separate overlay window to find a folder within which to save or relocate the document. While such multi-step menus may fit within GUIs of smaller screens, they often require a series of clicks, swipes, or other user interactions for each individual document to reorganize the document within a folder hierarchy—thereby hiding selectable options behind other options in menus and multiplying nuanced selections or other user interactions in computing devices for each separate document. Such a series of nuanced touch gestures (or other series of user interactions) have proven overly cumbersome for mobile devices or other computer devices with smaller screens.

SUMMARY

This disclosure describes one or more embodiments of systems, methods, and non-transitory computer readable storage media that provide benefits and/or solve one or more of the foregoing and other problems in the art. In particular, the disclosed systems can display icons for target digital content items and candidate destination folders within different sections of a multi-section graphical user interface (GUI) and adjust a corresponding file storage structure to reflect organization changes indicated by user interactions that move digital-content-items icons into folder icons. Such a multi-section GUI can facilitate efficient and flexible organization of digital content items within an underlying file storage structure in mobile devices and other computing devices with relatively smaller screens.

For example, the disclosed systems can display, within a first section of a multi-section GUI, icons representing digital content items that are selected (or otherwise identified) to be organized within an underlying file storage structure. Moreover, the disclosed system can also display, within a second section of the multi-section GUI, icons representing folders that are selected (or otherwise identified) as candidate destination folders within the underlying file storage structure for the identified digital content items. Having icons for target digital content items and destination folders displayed in different sections, the disclosed systems can detect user interactions that move digital-content-item icons to folder icons (between the first and second section) and adjust an underlying file storage structure to reflect the organization indicated by the user interaction. In this manner, the disclosed systems provide a digital organization space within a multi-section GUI that facilitates user-friendly inputs to organize digital content items (from various folders) to various destination folders within GUIs of smaller screens in mobile devices or other computing devices.

BRIEF DESCRIPTION OF THE DRAWINGS

The detailed description is described with reference to the accompanying drawings in which:

FIGS. 2A-2E illustrate a file organization system identifying and displaying digital-content-item icons and folder icons within a multi-section GUI in accordance with one or more implementations.

FIGS. 3A-3C illustrate a file organization system moving a digital-content-item icon from one section to a destination folder icon in another section of a multi-section GUI and modifying a file storage structure in accordance with one or more implementations.

FIGS. 6A and 6B illustrate a file organization system displaying a hierarchical map to locate a digital-content-item icon or folder icon within a file storage structure in accordance with one or more implementations.

DETAILED DESCRIPTION

Figure 1:
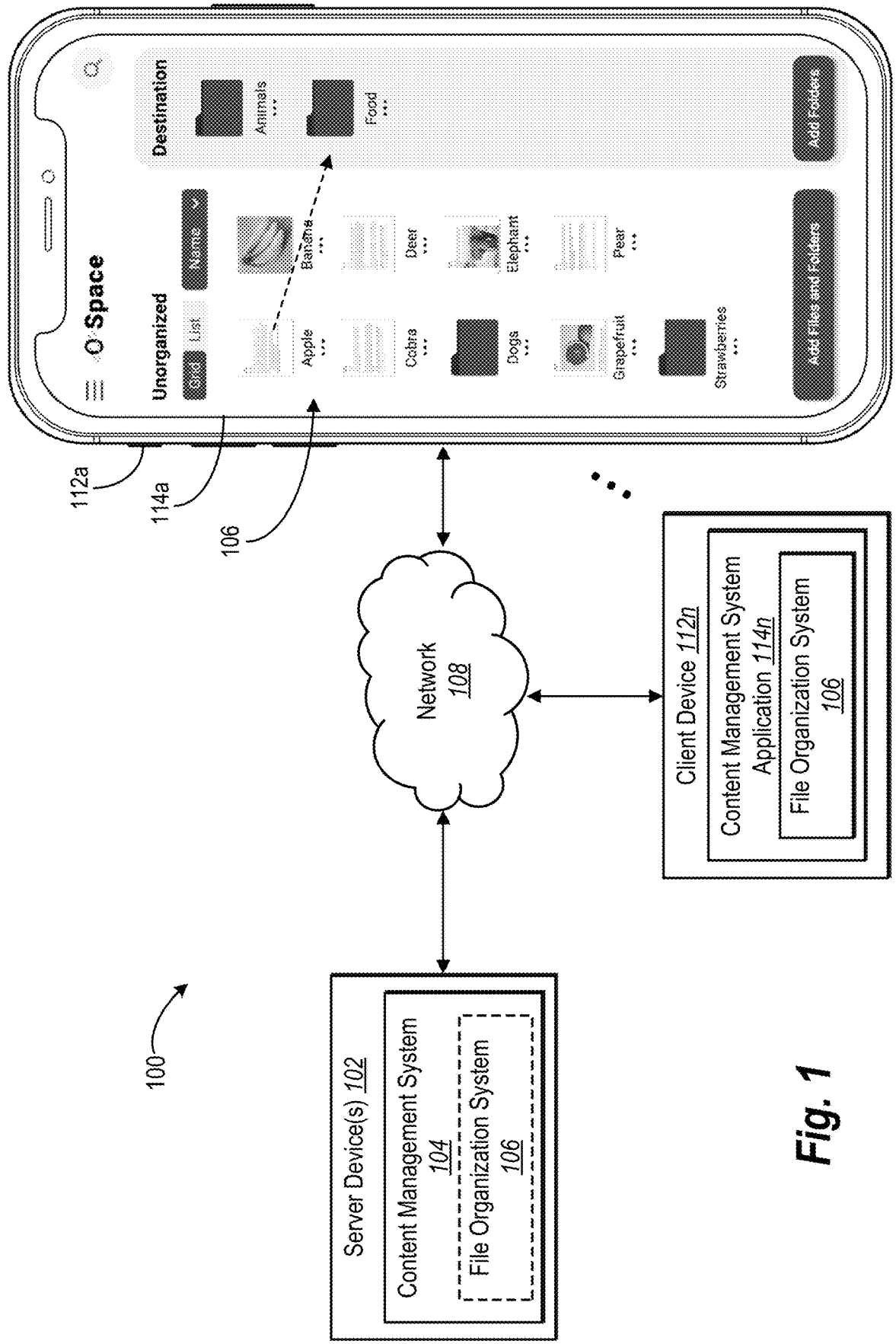
FIG. 1 illustrates a schematic diagram of an example system in which a file organization system operates in accordance with one or more implementations.

This disclosure describes one or more embodiments of a file organization system that displays moveable digital content items in a first section and folders in a second section of a multi-section GUI for a digital organization space and adjusts a corresponding file storage structure to reflect file organization or reorganization indicated by user interactions that move digital-content-items icons across sections and into folder icons. In particular, the file organization system can display, within a first section of a multi-section GUI, digital-content-item icons that correspond to digital content items of a file storage structure. The file organization system can similarly display, within a second section of a multi-section GUI, folder icons that correspond to folders of the file storage structure. Based on detecting or receiving user interactions within the multi-section GUI, the file organization system can move a digital-content-item icon (corresponding to a digital content item) from the first section to a folder icon (corresponding to a folder) in the second section. In response to moving the digital-content-item icon into the folder icon, the file organization system can modify an underlying file storage structure to move the digital content item into the folder.

For instance, the file organization system can identify digital content items and folders from a file storage structure for display and interaction with as part of a digital organization space. In some implementations, the file organization system identifies the digital content items (for display within a first section of the multi-section GUI) and the folder (for display within a second section of the multi-section GUI) from user selections of digital content items and folders. By contrast, in one or more embodiments, the file organization system automatically identifies the digital content items utilizing a machine learning model that predicts that a digital content item is misplaced (or is duplicative of another digital content item) within the file storage structure.

After identifying such digital content items to be organized, the file organization system can display, within the first section of the multi-section GUI, digital-content-item icons that correspond to the identified (or selected) digital content items from the file storage structure. In one or more embodiments, the first section can be an organization-target section containing digital content items (or folders) to be organized (or reorganized) within the file storage structure. Moreover, the file organization system can display, within the second section of the multi-section GUI, folder icons that correspond to the identified (e.g., selected or created) folders of the file storage structure. Indeed, the second section can be a destination section for folders as destinations within the file storage structure for the digital content items (or folder) from the organization-target section.

As suggested above, the file organization system can display icons for digital content items identified for reorganization and candidate destination folders in different sections of a multi-section GUI—but without a visualization of a folder hierarchy from which the digital content items and destination folders were identified. In one or more embodiments, for example, the file organization system can collectively display digital-content-items icons (within the first section) for digital content items initially identified from various locations of the file storage structure (e.g., from different parent folders, different hierarchical directories). In addition, the file organization system can also collectively display folder icons (within the second section) for folders from various locations of the file storage structure. By collectively displaying digital-content-item icons and folder icons from a variety of locations in a file storage structure within the multi-section GUI, the file organization system can provide a digital organization space that facilitates efficient and flexible access to organizational functionalities for the file storage structure within smaller screens of computing devices.

In addition to and distinct from the display and movement of icons within the multi-section GUI, the file organization system can modify the underlying file storage structure based on user interactions within the multi-section GUI moving icons across sections and into destination folder icons. As suggested above, the file organization system can detect or receive a user input (or user interaction) that moves (or associates) a digital-content-item icon to a folder icon within the multi-section GUI. The user input (or user interaction) can include a drag-and-drop interaction (or input), a voice-command input, or a move-option-icon selection to move the digital-content-item icon. Upon moving or associating the digital-content-item icon to or with the folder icon within the multi-section GUI, the file organization system can perform corresponding modifications to the file storage structure. In particular, the file organization system can move or associate a digital content item corresponding to the digital-content-item icon into or with a folder corresponding to the folder icon. In some implementations, the disclosed systems can visually move the digital-content-item icon to the folder icon while preserving the underlying file storage structure (e.g., not making changes to the digital content item and folder in the file storage structure) until a digital organization space displayed as the multi-section GUI is terminated (or saved).

The file organization system provides several technical advantages over existing document hosting systems. For example, the file organization system improves upon the graphical user interfaces of existing systems by generating (and displaying) an efficient multi-section GUI for a digital organization space. In particular, the file organization system reduces user navigation and visual clutter of conventional GUIs by providing a multi-section GUI through which the file organization system can organize and manage digital content items in destination folders—based on user interactions that move or associate digital-content-items icons across sections and into folder icons. Unlike existing systems that require adjustments of separate finder windows that encumber smaller screens or require a number of navigational steps through multi-step menus, the file organization system condenses navigational steps by utilizing the multi-section GUI to display (and move around) digital-content-item icons within a first section for digital content items to be organized and folder icons within a second section for candidate destination folders from various locations of the file storage structure. Based on user interactions between displayed digital-content-item icons and folder icons—and across different sections—the file organization system can efficiently facilitate the organization of content across various locations of a file storage structure within limited screen spaces of mobile or other devices.

In addition to improved navigation and user-friendly organization, the file organization system introduces a new easy-to-use visual space for organization—a flexible multi-section GUI that provides various file organizing functionalities through a digital organization space. To illustrate, the file organization system generates (and displays) a dynamic multi-section GUI that facilitates the user-friendly movement (or associations between) digital-content-item icons and folder icons from various locations of a file storage structure based on a simple user interaction or series of user interactions (e.g., drag-and-drop operation). Indeed, the file organization system can flexibly provide access to underlying file organization functions of a file storage structure in a consolidated multi-section GUI with user-friendly interactions—but without displaying the larger file storage structure for the digital content items and folders displayed as icons within the multi-section GUI. By contrast, existing systems oftentimes require a computing device to navigate through a separate multi-step menu to access a move command (followed by additional search windows for folders) or adjust the location or size of separate search windows each showing (or indicating) different folder hierarchies to facilitate a file structure reorganization. Accordingly, through the sandbox-like digital organization space displayed in the multi-section GUI, the file organization system can receive user interactions to rearrange digital-content-item icons and folder icons for various locations of the file storage structure (and execute corresponding changes to the file storage structure) without having to access or display the file storage structure or separate search windows within limited screen spaces of mobile devices.

Beyond improved navigation and a new visual platform for organization, in some embodiments, the file organization system also introduces new functionality within limited screen spaces of mobile or other devices through the sandbox-like digital organization space. In some cases, the sandbox-like digital organization space provides a canvas for a computing device to preliminarily move icons representing digital content items or folders without immediately changing the underlying file storage structure. The file organization system can subsequently adjust the file storage structure based on user interactions moving digital-content-item (or folder) icons—after the computing device detects user selections to close or leave the digital organization space. This new functionality within the sandbox-like digital organization space provides the computing device with a trial space for organizing (or reorganizing) digital content items and/or folders—before selecting to carry through such proposed changes to a file storage structure and/or synchronizing changes to the file storage structure on other devices.

As illustrated by the foregoing discussion, the present disclosure utilizes a variety of terms to describe features and benefits of the file organization system. Additional detail is now provided regarding the meaning of these terms. As used herein, the term "multi-section graphical user interface" refers to a graphical user interface having multiple sections comprising digital-content-item icons and/or folder icons. For example, the multi-section GUI can include different graphical sections comprising icons representing digital content items or folders that can be moved to prompt changes in a file storage structure.

In some embodiments, a multi-section GUI includes (i) a first section (e.g., an organization-target section) comprising digital-content-item icons or folder icons respectively corresponding to digital content items or folders to be organized and (ii) a second section (e.g., a destination section) comprising folder icons corresponding to folders as candidate destinations within a file storage structure for target-digital-content-item icons. Indeed, the file organization system can display a digital organization space by visualizing moveable digital content items in the first section (as digital-content-item icons) and candidate destination folders (as folder icons) in the second section to facilitate the organization of digital content items of an underlying file storage structure (e.g., from multiple locations of the file storage structure).

As used herein, the term "file storage structure" refers to a hierarchical collection of files and folders (or directories) that represent digital content items and storage locations for the digital content items. For example, the file storage structure can include a hierarchical collection of directories (e.g., nested parent folders and/or a storage location folder), one or more files under the directories (e.g., files that represent digital content items), and/or metadata for the files. Moreover, a file storage structure can represent a disk file system, flash file system, database file system, and/or network file system. Additionally, a file storage structure can represent a cloud-based service file system (e.g., a content management system) that synchronizes a hierarchical collection of directories, one or more files under the directories, and/or metadata for the files across one or more server devices (e.g., cloud-computing devices) and/or one or more client devices.

As further used herein, the term "digital content item" refers to a discrete data representation of a document, file, or image. In particular, a digital content item can include, but is not limited to, a digital image, a digital video, an electronic document (e.g., text file, spreadsheet, PDF, forms), and/or electronic communication. In addition, a digital content item can include data such as, but not limited to, user settings, user permissions, and/or content sharing settings. In some cases, a digital content item includes a folder. Furthermore, as used herein, the term "digital-content-item icon" refers to a graphical user interface element or graphic that depicts or represents a digital content item. In some cases, a digital-content-item icon includes a folder icon. Furthermore, the digital-content-item icon can be associated with options to open, preview, move, delete, remove, rename, and/or locate a file associated with the digital content item. As explained further below, in some cases, the file organization system can detect an option to locate a file and display a visualized hierarchy map of the file storage structure—including a visualization of file icons associated with the file.

Additionally, as used herein, the term "folder" refers to a discrete data representation of an organizational grouping of digital content items, folders, or other data or a directory that contains references to digital content item files and their locations in a file storage structure. In particular, a folder can include a cataloging structure that includes other folders (or directories) and/or electronic files that represent data for digital content items. Furthermore, the file organization system, through the file storage structure, can include parent folders (e.g., directories) and/or child folders (e.g., subdirectories) that create a hierarchical file system (e.g., with folders and files organized to represent a tree which indicates the storage locations of files).

Furthermore, as used herein, the term "folder icon" refers to a graphical user interface element or graphic that depicts or represents a folder. Furthermore, the folder icon can be associated with options to open, preview, move, delete, remove, rename, locate a folder within a file storage structure, and/or locate (or pinpoint) digital content items contained within the folder corresponding to the folder icon (e.g., within a hierarchy map).

In addition, as used herein, the term "hierarchy map" refers to a visual representation of a digital content item (or folder) and its location within a file storage structure through visual edges. For example, the file organization system displays a hierarchy map (in response to a user interaction requesting to locate a digital content item) to visually represent a digital-content-item icon for the digital content and one or more edges connecting the digital-content-item icon to one or more nested parent-folder icons that represent one or more nested folders of the digital content item within the file storage structure. Indeed, the hierarchy map can represent a path of a file storage location for the digital content item from a root (or starting) folder of the file storage structure to provide visual context of where the digital content item resides within the file storage structure.

As used herein, the term "machine learning model" refers to a computer representation that can be tuned (e.g., trained) based on inputs to approximate unknown functions. For instance, a machine-learning model can include, but is not limited to, a differentiable function approximator, a neural network (e.g., a convolutional neural network or deep learning model), a decision tree (e.g., a gradient boosted decision tree), a linear regression model, a logistic regression model, a clustering model, association rule learning, inductive logic programming, support vector learning, Bayesian network, regression-based model, principal component analysis, or a combination thereof. In some cases, a machine learning model can be adjusted or trained to detect (or predict) that a digital content item is misplaced or unorganized within the file storage structure or duplicative of another digital content item within the file storage structure. Furthermore, the machine learning model can be adjusted or trained to identify folders for the misplaced (or duplicative) digital content items as possible candidate destinations for the digital content items (e.g., based on similarities between the one or more digital content items and digital content items corresponding to the one or more folders).

Additionally, as used herein, the term "neural network" refers to a machine learning algorithm that can be tuned (e.g., trained) based on training inputs to estimate an unknown function. In particular, a neural network can include a plurality of interconnected artificial neurons that transmit data to other artificial neurons that generate outputs based on one or more inputs. More specifically, the plurality of interconnected neurons can learn to estimate complex elements by utilizing prior estimations and other training data. For example, a neural network can include deep neural networks, convolutional neural networks ("CNN"), fully convolutional neural networks ("FCN"), or recurrent neural networks ("RNN").

Turning now to the figures, FIG. 1 illustrates a schematic diagram of one implementation of a system 100 (or environment) in which a file organization system 106 operates in accordance with one or more implementations. As illustrated in FIG. 1, the system 100 includes server device(s) 102, a network 108, and client devices 112a-112n. As further illustrated in FIG. 1, the server device(s) 102 and the client devices 112a-112n communicate via the network 108.

As shown in FIG. 1, the server device(s) 102 include a content management system 104, which further includes the file organization system 106. In particular, the content management system 104 provides functionality by which a user (not shown in FIG. 1) can use the client device 112a or 112n to generate, manage, and/or store digital content. For example, a user can generate new digital content using the client device 112a. Subsequently, a user utilizes the client device 112a to send the digital content to the content management system 104 hosted on the server device(s) 102 via the network 108. The content management system 104 can then provide many options that the client device 112a may utilize (and a user selects or otherwise interacts with) to store the digital content, organize the digital content, share the digital content, and subsequently search for, access, view, and/or modify the digital content. Additional detail regarding the content management system 104 is provided below (e.g., in relation to FIG. 11 and the content management system 1102). Furthermore, the server device(s) 102 can include, but are not limited to, a computing (or computer) device (as explained below with reference to FIG. 10).

As further shown in FIG. 1, the system 100 includes the client devices 112a-112n. In one or more implementations, the client devices 112a-112n include, but are not limited to, mobile devices (e.g., smartphones, tablets), laptops, desktops, or other types of computing devices, as explained below with reference to FIG. 10. For example, the client devices 112a-112n can be operated by users to perform various functions (e.g., via the content management system applications 114a-114n) such as, but not limited to, creating, receiving, viewing, modifying, and/or transmitting digital content, configuring user account or application settings of the content management system 104, and/or electronically communicating with other user accounts of the content management system 104.

To access the functionalities of the content management system 104 (and the file organization system 106), users can interact with the content management system applications 114a-114n via the client devices 112a-112n. The content management system applications 114a-114n can include one or more software applications installed on the client devices 112a-112n. In some implementations, the content management system applications 114a-114n can include one or more software applications that are downloaded and installed on the client devices 112a-112n to include an implementation of the file organization system 106. In some embodiments, the content management system applications 114a-114n are hosted on the server device(s) 102 and are accessed by the client devices 112a-112n through a web browser and/or another online platform. Moreover, the content management system applications 114a-114n can include functionalities to access or modify a file storage structure stored locally on the client devices 112a-112n and/or hosted on the server device(s) 102. In one or more embodiments, the client devices 112a-112n include various numbers and types of client devices.

As just mentioned, in some embodiments, the client devices 112a-112n include the file organization system 106 (through the content management system applications 114a-114n). In particular, as shown in FIG. 1, the client device 112a implements the file organization system 106 through the content management system application 114a. As shown in FIG. 1, the file organization system 106 (via the content management system application 114a) displays a multi-section GUI for a digital organization space that visualizes moveable digital content items in a first section (as digital-content-item icons) and candidate destination folders (as folder icons) in a second section. As shown in FIG. 1, the file organization system 106 (via the content management system application 114a), based on receiving user interactions within the multi-section GUI, the file organization system 106 can move a digital-content-item icon (corresponding to a digital content item) from the first section to a folder icon (corresponding to a folder) in the second section (e.g., the digital-content-item icon for "Apple" to the folder icon "Food"). Based on moving the digital-content-item icon to the folder icon, the file organization system 106 also modifies an underlying file storage structure (to move the digital content item into the folder) in accordance with one or more implementations herein.

Although FIG. 1 illustrates the file organization system 106 being implemented by a particular component and/or device within the system 100 (e.g., the client devices 112a-112n), in some embodiments, the file organization system 106 is implemented, in whole or part, by other computing devices and/or components in the system 100. For example, in some implementations, the file organization system 106 is implemented on the server device(s) 102 within the content management system 104. More specifically, in some embodiments, some or all of the file organization system 106 is implemented by the server device(s) 102 and accessed by the client devices 112a-112n through the content management system applications 114a-114n, web browsers, and/or other online platforms (as described above).

Additionally, as illustrated in FIG. 1, the system 100 includes the network 108 that enables communication between components of the system 100. In certain implementations, the network 108 includes a suitable network and may communicate using any communication platforms and technologies suitable for transporting data and/or communication signals between the server device(s) 102 and the client device(s) 112a-112n. An example of the network 108 is described with reference to FIG. 10 and/or FIG. 11. Furthermore, although FIG. 1 illustrates the server device(s) 102 and the client devices 112a-112n communicating via the network 108, in certain implementations, the various components of the system 100 communicate and/or interact via other methods (e.g., the server device(s) 102 and the client devices 112a-112n communicating directly).

As mentioned above, the file organization system 106 can display identified digital-content-items icons (within a first section) for digital content items and folder icons (within a second section) for folders from various locations of the file storage structure within a multi-section GUI. Indeed, in one or more embodiments, the file organization system 106 can display, within the first section of the multi-section GUI, digital-content-item icons that correspond to the identified (or selected) digital content items of the file storage structure. Moreover, the file organization system 106 can display, within the second section of the multi-section GUI, folder icons that correspond to the identified (e.g., selected or created) folders of the file storage structure. In accordance with one or more embodiments, FIGS. 2A-2D illustrate the file organization system 106 collectively displaying, within a multi-section GUI, identified digital-content-items icons (within a first section) for digital content items from various locations of the file storage structure and identified folder icons (within a second section) for folders also from various locations of the file storage structure.

For example, FIG. 2A illustrates the file organization system 106 displaying a multi-section GUI 202 for a digital organization space within a client device 204 prior to the addition of digital content items to organize and/or the addition of destination folders. As shown in FIG. 2A, a first section 206 of the multi-section GUI 202 corresponds to an organization-target section for digital content items (or folders) to be organized within the file storage structure. In addition, as shown in FIG. 2A, a second section 208 of the multi-section GUI 202 corresponds to a destination section for folders as destinations within the file storage structure for the digital content items (or folder) from an organization-target section. Additionally, as shown in FIG. 2A, the file organization system 106 displays a selectable add-target-content option 210 (e.g., "Add file and folders") and a selectable add-folder option 212 (e.g., "Add Folders") within the multi-section GUI 202.

Upon detecting or receiving selection of the selectable add-target-content option 210 in the first section 206 (of FIG. 2A), the file organization system 106 displays a content selection GUI 214 (as shown in FIG. 2B). In particular, as shown in FIG. 2B, the file organization system 106 receives selections of one or more digital content items and/or folders to add to the first section 206 (of FIG. 2A) from digital content items and folders identified in a file storage structure as selectable digital content items 216a-216d and selectable folders 218a-218b. Indeed, the file organization system 106 also displays a selectable add option 220 that, upon selection, causes the file organization system 106 to add the selected digital content items 216a-216d and the selected folders 218a-218b to the first section 206 of the multi-section GUI 202 (e.g., in reference to FIG. 2A) to be selected for organization within one or more destination folders.

Although FIG. 2B illustrates a selection of multiple digital content items and folders, in one or more embodiments, the file organization system 106 can receive a selection of a single digital content item or folder. As further shown in FIG. 2B, the file organization system 106 can receive selections of digital content items and/or folders from various locations of the file storage structure (e.g., different folders/directories). As an example, as shown in FIG. 2B, the file organization system 106 receives a selection of a digital content item "Apple" from a folder named "Fruit Doc" and a digital content item "Deer" from a folder named "Documents" for addition into the first section 206 of the multi-section GUI 202 (e.g., in reference to FIG. 2A).

As further shown in FIG. 2B, the file organization system 106 displays a search bar 222. In some embodiments, the file organization system 106 receives, within the search bar 222, search queries to search the file storage structure for a specific digital content item and/or folder to add to the first section 206 of the multi-section GUI 202. For instance, the file organization system 106 can search and display digital content items and/or folders related to a search query. Then, the file organization system 106 can receive a selection of a displayed search result digital content item and/or folder. Additionally, the file organization system 106 can also include an option to navigate a graphical representation of the file storage structure within the content selection GUI 214 to explore and/or find specific digital content items and/or folders. In some cases, as shown in FIG. 2B, the file organization system 106 displays digital content items and/or folders (or all digital content items and/or folders) recently viewed or selected by a user.

Figure 2D:
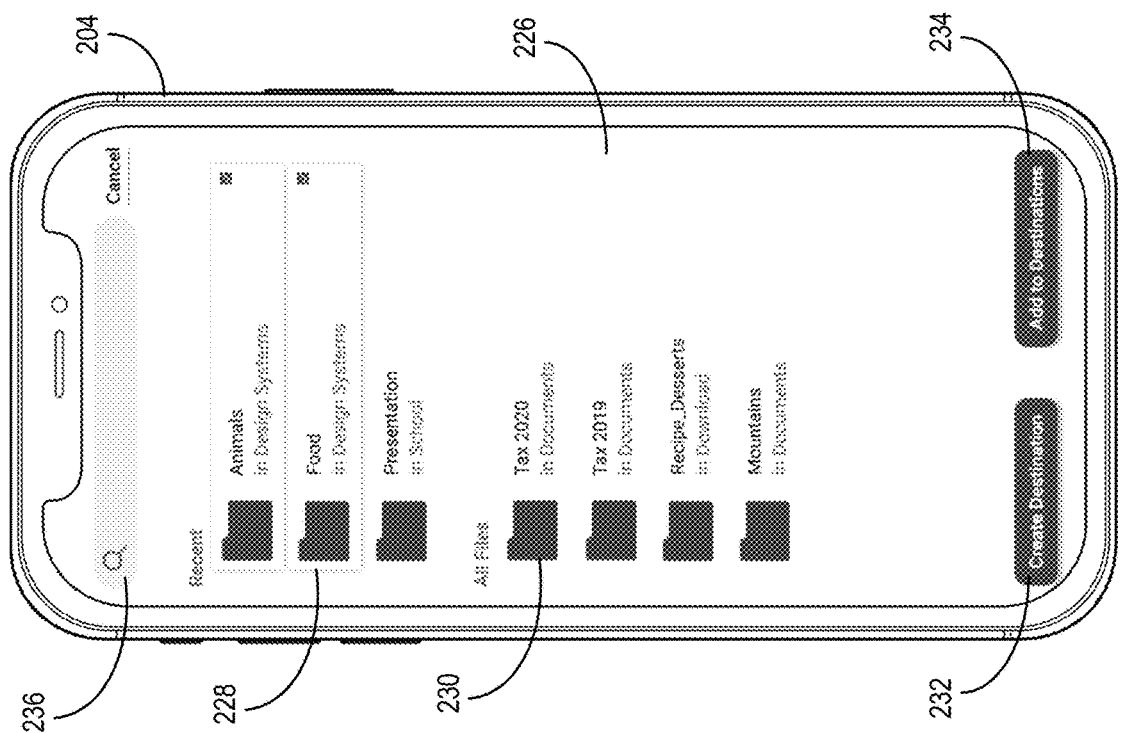
Figure 2C:
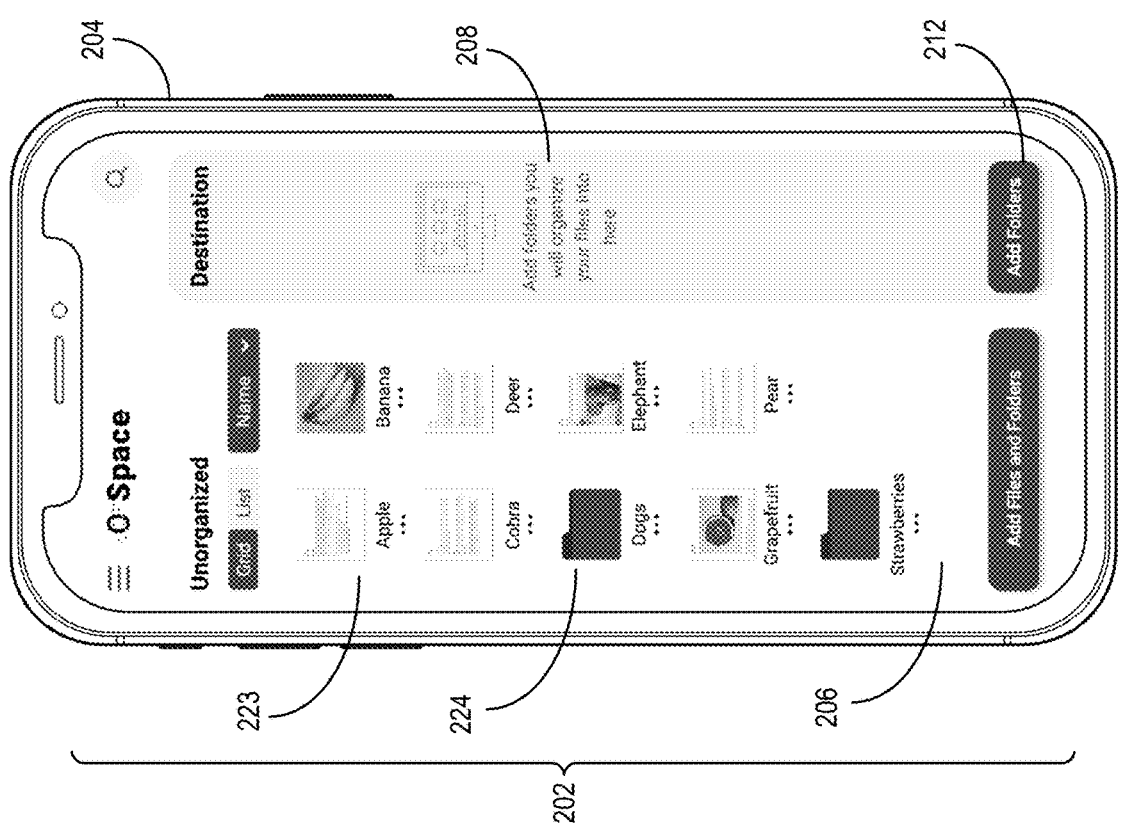

Upon detecting or receiving a selection of the digital content items 216a-216d and folders 218a-218b (as shown in FIG. 2B) and the selectable add option 220, the file organization system 106 displays the corresponding digital-content-item icons 223 and folder icons 224 within the first section 206 of the multi-section GUI 202 (as shown in FIG. 2C). In one or more embodiments, the digital-content-item icons 223 correspond to the digital content items from the file storage structure and the folder icons 224 correspond to the folders from the file storage structure (e.g., in reference to FIG. 2B). Indeed, as shown in FIG. 2C, the file organization system 106 displays digital-content-item icons and folders from various locations of a file storage structure in the multi-section GUI 202.

Furthermore, upon detecting or receiving a user selection of the selectable add-folder option 212, the file organization system 106 displays the content selection GUI 226 (as shown in FIG. 2D) to display one or more selectable destination folders 230 of a file storage structure. As shown in FIG. 2D, the file organization system 106 receives a selection of the selectable destination folders 228 within the content selection GUI 226. In addition, as shown in FIG. 2D, the file organization system 106 displays a selectable add-to-destination option 234 that, upon selection, causes the file organization system 106 to add the selected destination folders 228 to the second section 208 of the multi-section GUI 202 (in relation to FIG. 2C).

As further shown in FIG. 2D, the file organization system 106 can create a new destination folder. For example, as illustrated in FIG. 2D, the file organization system 106 can create a new destination folder (within the file storage structure) upon receiving a selection of the create-new-folder selectable option 232. Upon creating the new destination folder, the file organization system 106 can display the new destination folder as a selectable destination folder within the content selection GUI 226. In one or more embodiments, the file organization system 106 can create a new destination folder upon receiving a user interaction with a create-new-folder selectable option within a content selection GUI and/or within the second section of a multi-section GUI. Furthermore, as also shown in FIG. 2D, the file organization system 106 displays a search bar 236 to receive search queries in the search bar 236 to display folders related to the search query (as described above).

Figure 2E:
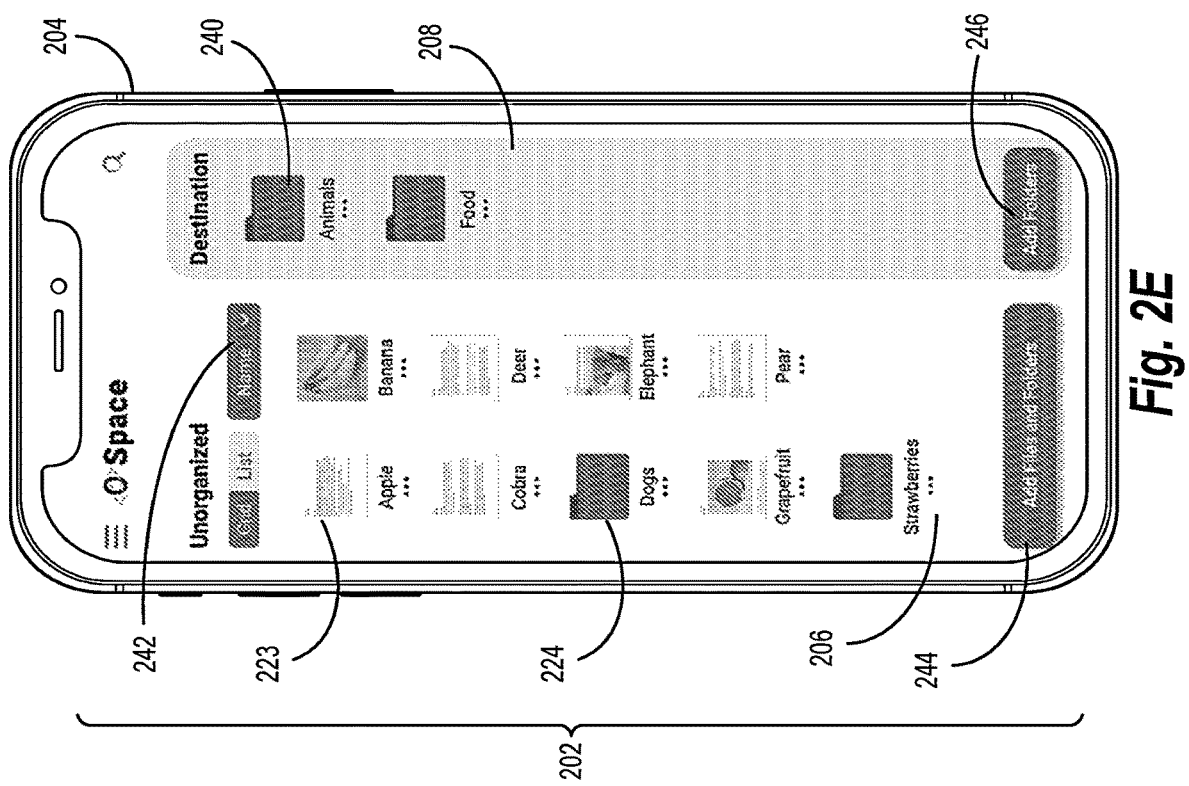

Upon detecting or receiving a selection of the destination folders 228 (as shown in FIG. 2D) for display within the second section 208 of the multi-section GUI 202, the file organization system 106 displays the corresponding folder icons 240 within the second section 208 (as shown in FIG. 2E). In one or more embodiments, the folder icons 240 correspond to the folders selected from a file storage structure (e.g., in reference to FIG. 2D). Indeed, as shown in FIG. 2E, the file organization system 106 displays folder icons from various locations of a file storage structure in the multi-section GUI 202 (in addition to the digital-content-item icons 223 and the folder icons 224 displayed with the first section 206).

As further shown in FIG. 2E, the file organization system 106 displays selectable options 242 to sort, filter, and/or change display views of the multi-section GUI 202. For example, the file organization system 106 can receive user interactions with the selectable options 242 to sort the digital-content-item icons, folder icons, and/or destination folder icons by different attributes (e.g., file type, dates, size). In addition, the file organization system 106 can receive user interactions with the selectable options 242 to change a displayed view of the digital-content-item icons, folder icons, and/or destination folder icons (e.g., a list view, gallery view, grid view). In addition, the file organization system 106 can add additional digital-content-item icons, folder icons, and/or destination folder icons in the first section 206 and the second section 208 upon detecting or receiving user interactions with additional icons and the selectable add-target-content option 244 and/or the selectable add-folder option 246.

As depicted by FIG. 2E, the file organization system 106 can display digital-content-item (or folder) icons from various locations of a file storage structure in a first section and folder icons from various locations of a file storage structure in a second section. In this manner, as shown in FIG. 2E, the file organization system 106 displays a multi-section GUI of a digital organization space that facilitates efficient and flexible organization of an underlying file storage structure within limited screen spaces of mobile devices and other computing devices (e.g., tablets).

Although FIG. 2E illustrates multiple digital-content item icons and/or folder icons, the file organization system 106 can include various combinations or individual digital-content-item icons and/or folder icons for display in a first section of a multi-section GUI. Likewise, the file organization system 106 can include various combinations of or individual folder icons in the second section of a multi-section GUI. Furthermore, although particular digital content item types are illustrated in FIGS. 2A-2E, the file organization system 106 can display digital-content-item icons and folder icons for various file types (e.g., images, documents, videos).

Although FIGS. 2A-2E illustrate a selection of the digital content items (and folders) in the first section and the folders in the second section, in one or more embodiments, the file organization system 106 can automatically populate the multi-section GUI with one or more digital-content-item icons and folder icons respectively corresponding to digital content items and folders. For example, the file organization system 106 automatically populates the first section with digital content items or folders predicted to be misplaced and/or duplicative utilizing a machine learning model (or other approach) as described below (e.g., in relation to FIGS. 8A and 8B). Likewise, the file organization system 106 can automatically populate the second section with destination folders that are automatically identified (or predicted) utilizing a machine learning model as described below (e.g., in relation to FIGS. 8A and 8B).

Figure 3C:
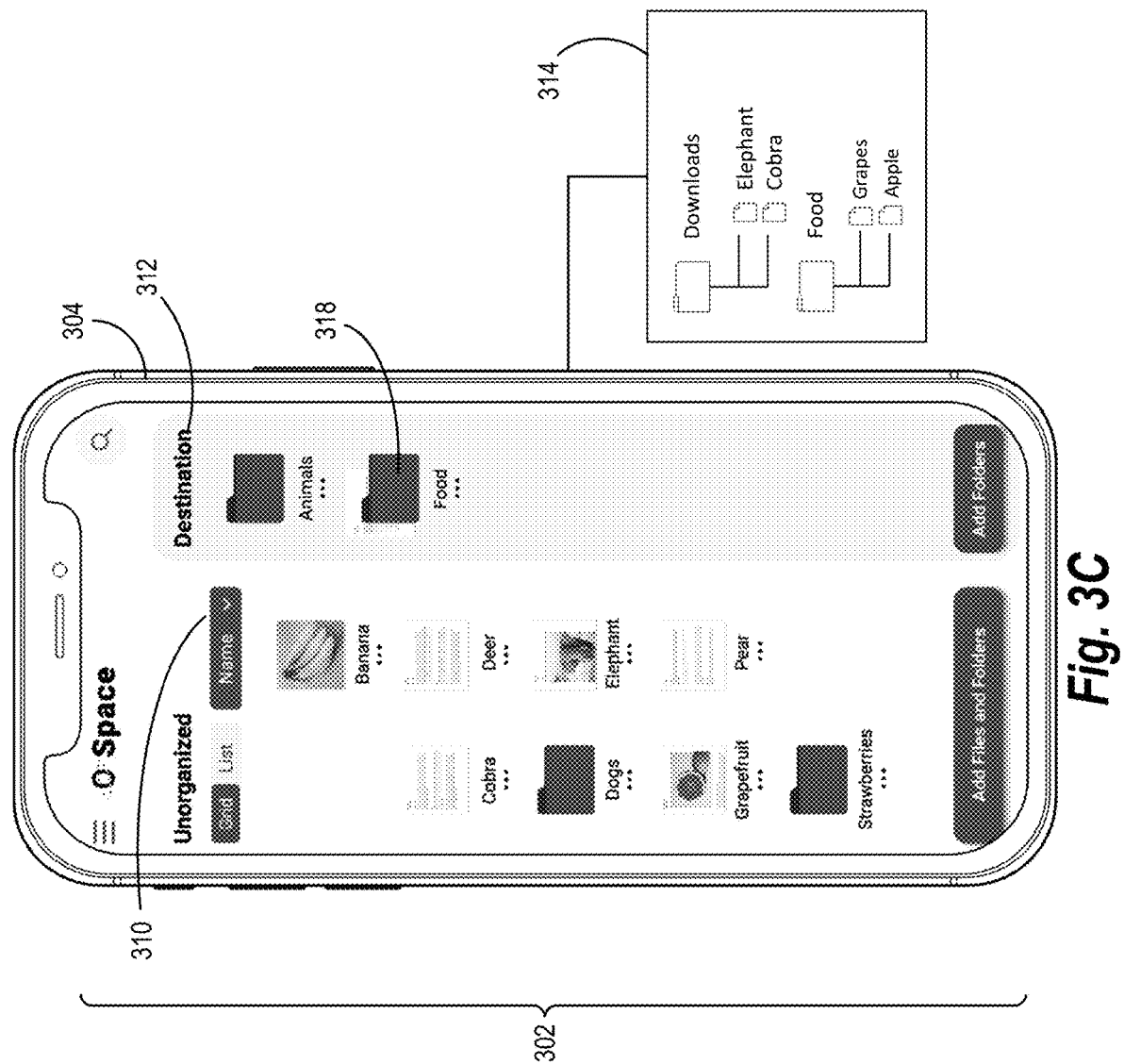

As previously mentioned, based on receiving user interactions (or user inputs) within the multi-section GUI, the file organization system 106 can move a digital-content-item icon (corresponding to a digital content item) from a first section to a folder icon (corresponding to a folder) in a second section. Based on moving the digital-content-item icon to the folder icon, the file organization system 106 can modify an underlying file storage structure (e.g., to move the digital content item into the folder). In accordance with one or more embodiments, FIGS. 3A-3C illustrate the file organization system 106 moving icons representing digital content items or folders and modifying an underlying file storage structure based on the moved icons. For example, FIG. 3A illustrates the file organization system 106 displaying a multi-section GUI 302 (within a client device 304) with digital-content-item icons 306 in a first section 310 and destination folder icons 308 in a second section 312. As further shown in FIG. 3A, the various digital-content-item icons 306 and destination folder icons 308 correspond to digital content items and folders in a file storage structure 314.

As shown in FIG. 3B, the file organization system 106 receives a user input (or interaction) to associate or move a digital-content-item icon 316 from the first section 310 of the multi-section GUI 302 to a destination folder icon 318 in the second section 312 of the multi-section GUI 302. For example, FIG. 3B illustrates the file organization system 106 moving the digital-content-item icon 316 (e.g., a document titled "Apple") towards a destination folder icon 318 (e.g., a folder icon titled "Food") upon receiving a drag-and-drop interaction with the digital-content-item icon 316.

As shown in FIG. 3C, the file organization system 106 can move the digital-content-item icon 316 (in reference to FIG. 3B) to the destination folder icon 318 within the multi-section GUI 302 such that the digital-content-item icon 316 is removed from display in the first section 310. In addition, as shown in FIG. 3C, based on moving the digital-content-item icon 316 (in reference to FIG. 3B) to the destination folder icon 318 (via a drag-and-drop interaction), the file organization system 106 further modifies the underlying file storage structure 314. As depicted in FIG. 3C, the file organization system 106 modifies the underlying file storage structure 314 to move the digital content item "Apple" (corresponding to the digital-content-item icon 316) to a folder "Food" (corresponding to the folder icon 318). Although not illustrated in FIG. 3C, upon moving the digital-content-item icon 316 (in reference to FIG. 3B) to the destination folder icon 318 (via a drag-and-drop interaction), in some instances, the file organization system 106 can rearrange the remaining digital-content-item icons in the first section 310 to fill empty spaces.

In some embodiments, the file organization system 106 modifies the file storage structure 314 locally within the client device 304. In one or more implementations, the file organization system 106 also synchronizes modifications to the file storage structure 314 with one or more additional locations. For example, the file organization system 106 can synchronize a modified file storage structure with a cloud-based or remote version of the file storage structure (e.g., within a cloud-based server and/or one or more additional client devices). In some cases, for instance, the file organization system 106 synchronizes a modified file storage structure with a global version of the file storage structure for a user account hosted by the server device(s) 102.

In some cases, as shown in FIG. 3B, the file organization system 106 displays a delete option 320 within the multi-section GUI 302 (e.g., upon receiving a drag-and-drop user interaction). Indeed, in reference to FIG. 3B, the file organization system 106 can receive a drag-and-drop user interaction moving a digital-content-item icon to the displayed delete option 320 within the multi-section GUI 302. In some implementations, based on detecting a selection or user interaction to move to the delete option 320, the file organization system 106 removes the digital content item icon from the multi-section GUI 302 (of the digital organization space). In addition, the file organization system 106 can also modify an underlying file storage structure to delete a digital content item (corresponding to the digital-content-item icon moved to the delete option 320) from the file storage structure. Although one or more embodiments illustrate the delete option as a drag-and-drop destination icon, the file organization system 106 can display or include a delete option within a function pop up menu, as a voice input option, and/or as another selectable GUI element.

Although FIGS. 3A-3C illustrate moving a single digital-content-item icon, the file organization system 106 can move multiple selected digital-content-item icons and/or folder icons (from various locations of a file storage structure) to a destination folder icon. Indeed, the file organization system 106 can select multiple digital-content-item icons and/or folder icons (e.g., based on user selections) and, subsequently, drag-and-drop the multiple selected digital-content-item icons and/or folder icons to a destination folder icon. Then, the file organization system 106 can modify the underlying file storage structure to reflect the movement of the multiple digital-content-item icons (with their corresponding digital content items) and/or folder icons (with their corresponding folders) to a destination folder icon (corresponding to a destination folder) in the underlying file storage structure.

Figure 3E:
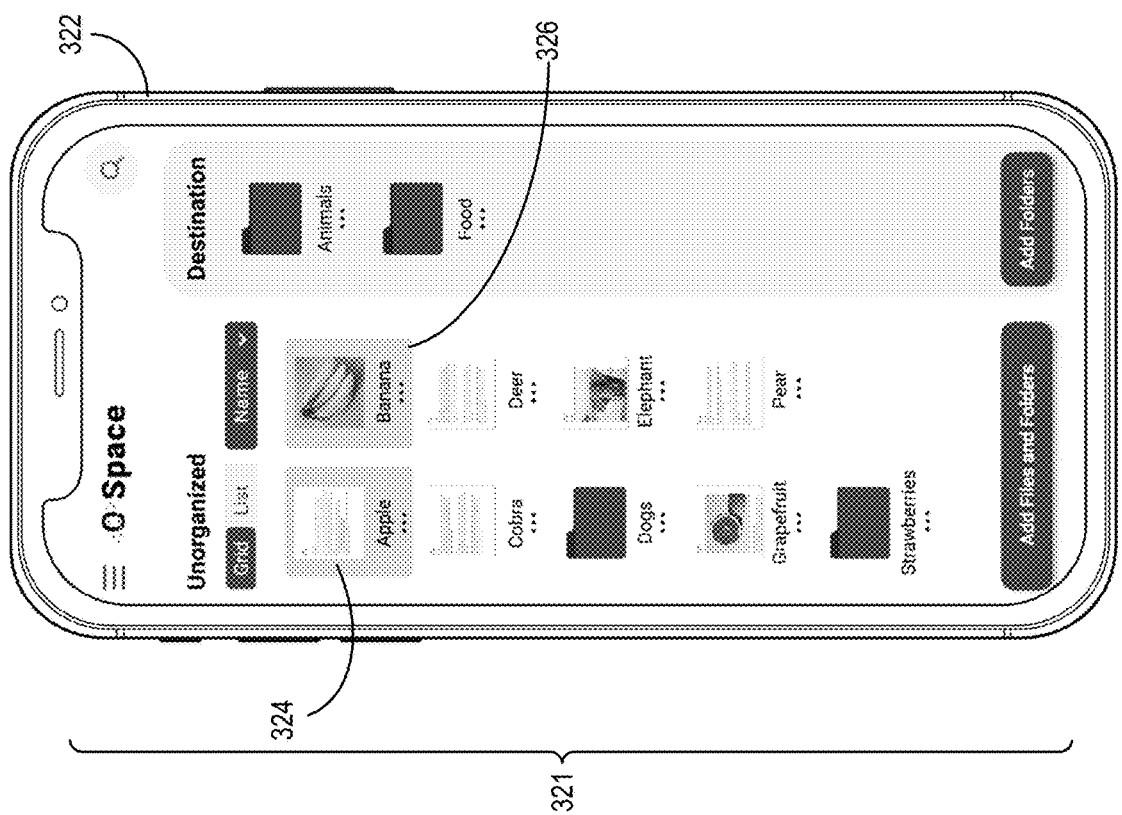
FIGS. 3D-3F illustrate a file organization system moving multiple digital-content-item icons from one section to a destination folder icon in another section of a multi-section GUI in accordance with one or more implementations.
Figure 3D:
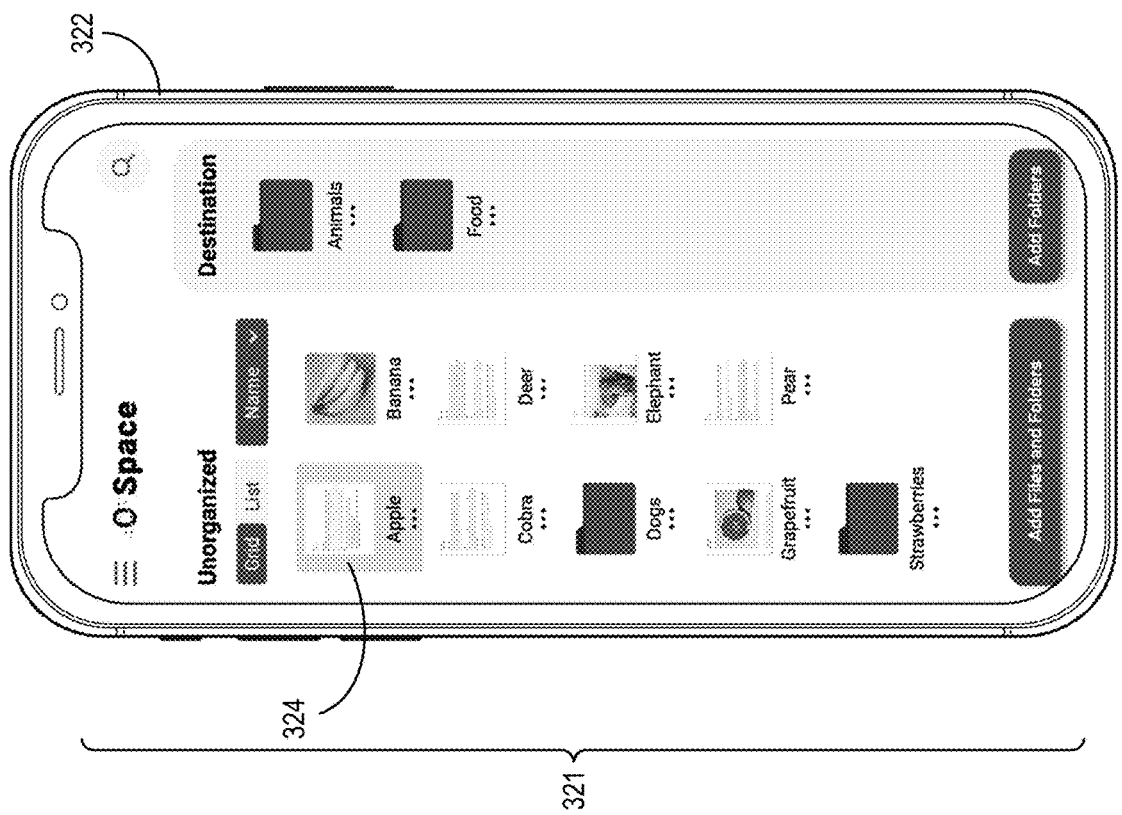
Figure 3F:
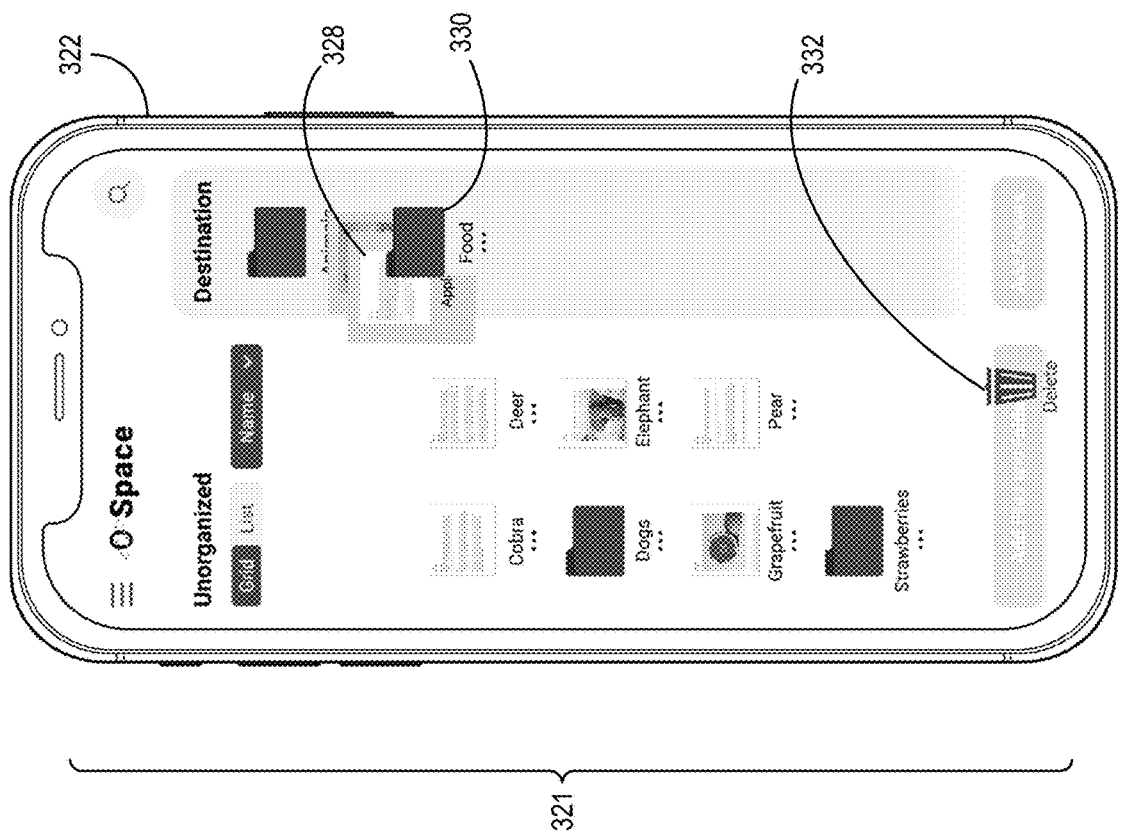

For example, FIGS. 3D-3F illustrate the file organization system 106 moving multiple selected digital-content-item icons (e.g., from various locations of a file storage structure) to a destination folder icon. As shown in FIG. 3D, the file organization system 106 displays a multi-section GUI 321 (within a client device 322) with digital-content-item icons in a first section and destination folder icons in a second section. Furthermore, as shown in FIG. 3D, the file organization system 106 receives a selection of the digital-content-item icon 324. As further shown in FIG. 3E, the file organization system 106 receives an additional selection of the digital-content-item icon 326. Indeed, in some embodiments, the file organization system 106 can receive a selection of multiple digital-content-item icons (e.g., the digital-content-item icons 324 and 326) by receiving a long press touch user interaction (e.g., caused by detecting a finger touching the screen and holding the touch interaction) followed by a drag user interaction (e.g., moving the finger to touch other portions of the screen in a vertical, horizontal, and/or diagonal direction) to select the multiple digital-content-item icons.

As shown in FIG. 3F, the file organization system 106 receives a user input (or interaction) to collectively associate or move multi-selected digital-content-item icons 328 from the first section of the multi-section GUI 321 to a destination folder icon 330 in a second section of the multi-section GUI 321. Indeed, upon moving the multi-selected digital-content-item icons 328 to the destination folder icon 330, the file organization system 106 can modify a file storage structure and/or the multi-section GUI 321 in accordance with one or more embodiments.

Although not shown in FIGS. 3D-3F, the file organization system 106 can utilize other user inputs (e.g., a voice input, a selectable move option) to move multiple digital-content-item icons to a destination folder icon. Moreover, although FIGS. 3D-3F illustrate the multi-selection of digital-content-item icons, the file organization system 106 can also receive a multi-selection of various combinations of digital-content-item icons and/or folder icons. As further shown in FIG. 3F, the file organization system 106 can also receive a user interaction moving the multi-selected digital-content-item icons 328 to the delete option 332 and delete the digital content items associated with the multi-selected digital-content-item icons 328 within the file storage structure.

Furthermore, in some embodiments, the file organization system 106 receives a selection of the multiple digital-content-item icons from a selection interaction. In particular, the file organization system 106 can receive a user interaction with a select option and, in response, provide for display, within the multi-section GUI, the digital-content-item icons (or folder icons) with a visual indication that indicates that the digital-content-item icons (or folder icons) are selectable (e.g., checkboxes, highlight). Upon receiving a user interaction with one or more of the digital-content-item icons (or folder icons), the file organization system 106 indicates the digital-content-item icons (or folder icons) as selected within the multi-section GUI (e.g., checking a checkbox, changing a highlight color). Then, the file organization system 106 can receive a user interaction moving the multi-selection of the digital-content-item icons (or folder icons) to a destination folder in accordance with one or more embodiments herein.

Although FIGS. 3A-3C illustrate utilizing a drag-and-drop user interaction, the file organization system 106 can receive various user inputs to move digital-content-item icons and/or folder icons to a destination folder icon. For example, the file organization system 106 can receive a voice input. To illustrate, in reference to FIG. 3B, the file organization system 106 can detect or receive a voice command to move a digital-content-item icon to a destination folder icon (e.g., "move the file Apple to the Food folder"). In response, in reference to FIG. 3B, the file organization system 106 can move a digital-content-item icon 316 for the file "Apple" to a destination folder icon 318 for the folder "Food" (and subsequently remove the digital-content-item icon 316 from the multi-section GUI 302). In reference to FIG. 3C, the file organization system 106 can also modify the file storage structure 314 based on the voice input to implement the requested change based on moving the digital-content-item icon 316 to the destination folder icon 318.

In addition to the tools and options shown in FIGS. 3A-3C, in one or more embodiments, the file organization system 106 can display a selectable undo option. In particular, upon receiving a selection of the undo option, the file organization system 106 can undo or back trace a move of a digital-content-item icon and/or folder icon from a second section of a multi-section GUI to a first section of a multi-section GUI. In many cases, if the file storage structure was modified, the file organization system 106 can also undo changes in the file storage structure upon receiving the selection of the undo option. Indeed, the file organization system 106 can backtrack and undo a various number of changes and/or user interactions within a multi-section GUI of a digital organization space.

Figure 4:
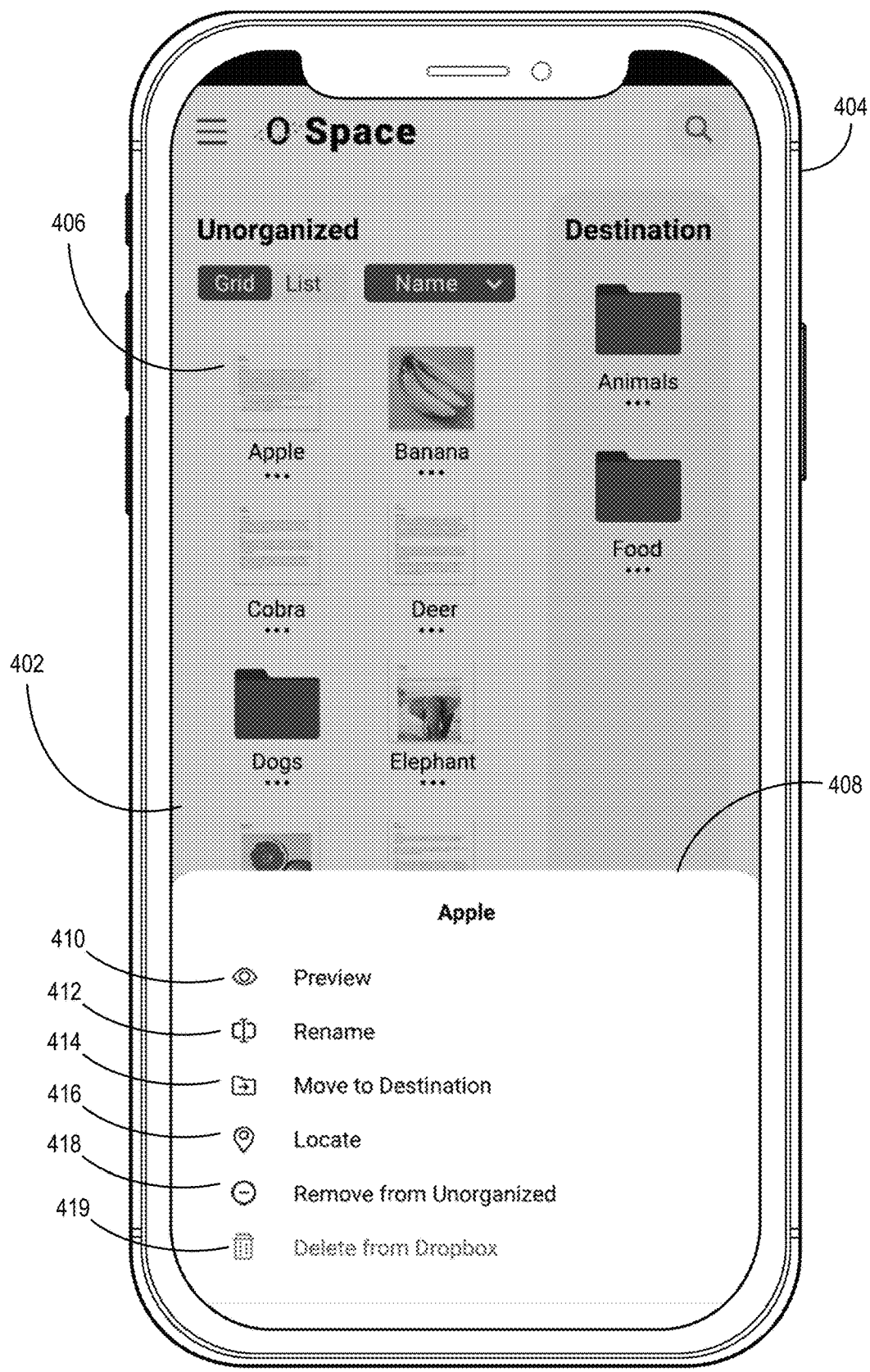
FIG. 4 illustrates a file organization system displaying selectable options for a digital-content-item icon or a folder icon in accordance with one or more implementations.

In one or more embodiments, the file organization system 106 can display one or more selectable options to manage or view properties of a digital-content-item icon (or a folder icon) within a multi-section GUI (e.g., in either a first and/or second section of a multi-section GUI). As shown in FIG. 4, upon selection of a digital-content-item icon 406 (e.g., via touch, selection, or a press-and-hold action) in a multi-section GUI 402 of a client device 404, the file organization system 106 displays a pop-up function selector 408 having multiple selectable options. For example, as shown in FIG. 4, the selectable options include a preview option 410, a rename option 412, a move option 414, a locate option 416, a close option 418 (e.g., "Remove from Unorganized"), and/or a delete option 419 (e.g., "Delete from Dropbox").

In some implementations, upon receiving a selection of the selectable preview option 410 (in reference to FIG. 4), the file organization system 106 can display a preview of a digital content item associated with the digital-content-item icon 406. For example, the preview can include a display of the content of the digital-content-item icon (e.g., a preview image, a preview video, and/or a preview document within a preview user interface). In some instances, the preview can also include metadata for the digital content item corresponding to a digital-content-item icon.

In addition or in the alternative to a preview of a digital content item, in some embodiments, the file organization system 106 can display a preview of a folder upon receiving a selection of a selectable preview option in relation to a folder icon. For instance, a preview of a folder can include a displayed preview of the content within the folder. For example, the file organization system 106 can display digital content items that are located within a folder. In some cases, when a selectable preview option is selected for a destination folder (e.g., from a second section of a multi-section GUI), the file organization system 106 can display digital content items that are located within the destination folder with an indication of which digital content items were recently moved to the destination folder (e.g., in the last week, in the last few hours, during the current digital organization space session).

As further indicated by FIG. 4, upon receiving a selection of the rename option 412, the file organization system 106 can prompt for input text (or voice input) to rename a digital content item associated with a digital-content-item icon and/or a folder associated with a folder icon. Moreover, upon receiving a selection of the move option 414, the file organization system 106 can display an option to move a digital-content-item icon and/or folder icon to a destination folder icon in a second section, as described in greater detail below (e.g., in relation to FIGS. 5A-5C). Furthermore, upon receiving a selection of the locate option 416, the file organization system 106 can display a hierarchy map for a digital content item (or folder) as described in greater detail below (e.g., in relation to FIGS. 6A-6D).

As indicated above, the file organization system 106 also displays a selectable close option 418 (e.g., "Remove from Unorganized"). Upon receiving a selection of the close option 418, the file organization system 106 can remove a digital-content-item icon or folder icon from a first and/or second section of a multi-section GUI of a digital organization space. Indeed, the file organization system 106 can remove the digital-content-item icon or folder without deleting a corresponding digital content item or folder within a file storage structure. Instead, the file organization system 106 can remove a digital-content-item icon or folder icon from the multi-section GUI to remove the digital-content-item icon or folder icon from the digital organization space upon receiving a selection of the selectable close option (e.g., "Remove from Unorganized" option). Additionally, in some embodiments, upon receiving a selection of the delete option 419, the file organization system 106 can delete (from the file storage structure) the digital content item corresponding to the digital-content-item icon.

As just mentioned, upon receiving a selection of the move option 414, the file organization system 106 can display an option to move a digital-content-item icon (or folder icon) from a first section of a multi-section GUI to a destination folder icon in a second section of the multi-section GUI. In accordance with one or more embodiments, FIGS. 5A-5C illustrate a flow of the file organization system 106 displaying functionalities to move a digital content item icon or folder icon to a destination folder upon receiving a selection of a selectable move option.

Figure 5A:
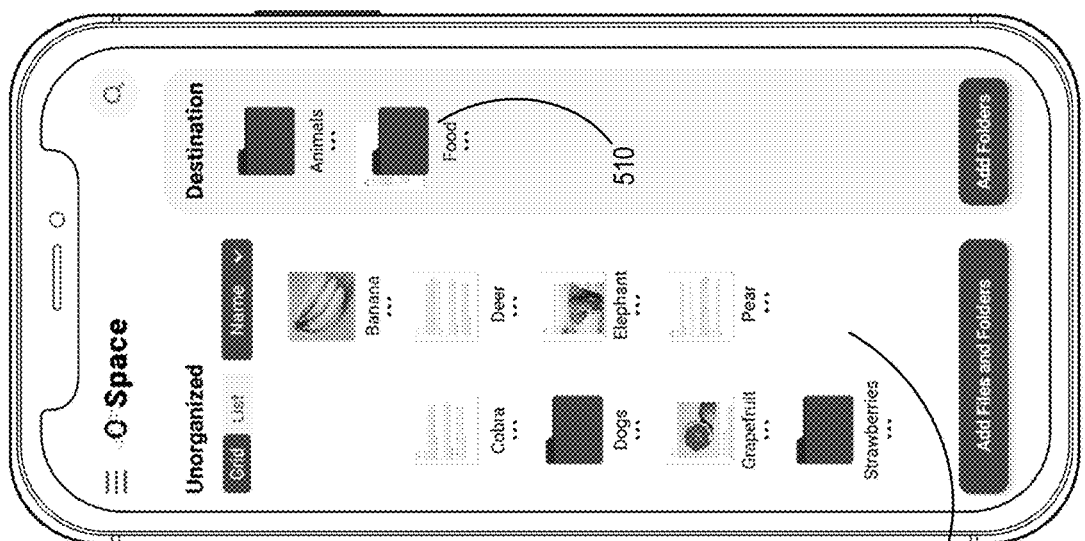
FIGS. 5A-5C illustrate a file organization system moving a digital-content-item icon to a folder icon in response to a user selection of a move option in accordance with one or more implementations.
Figure 5B:
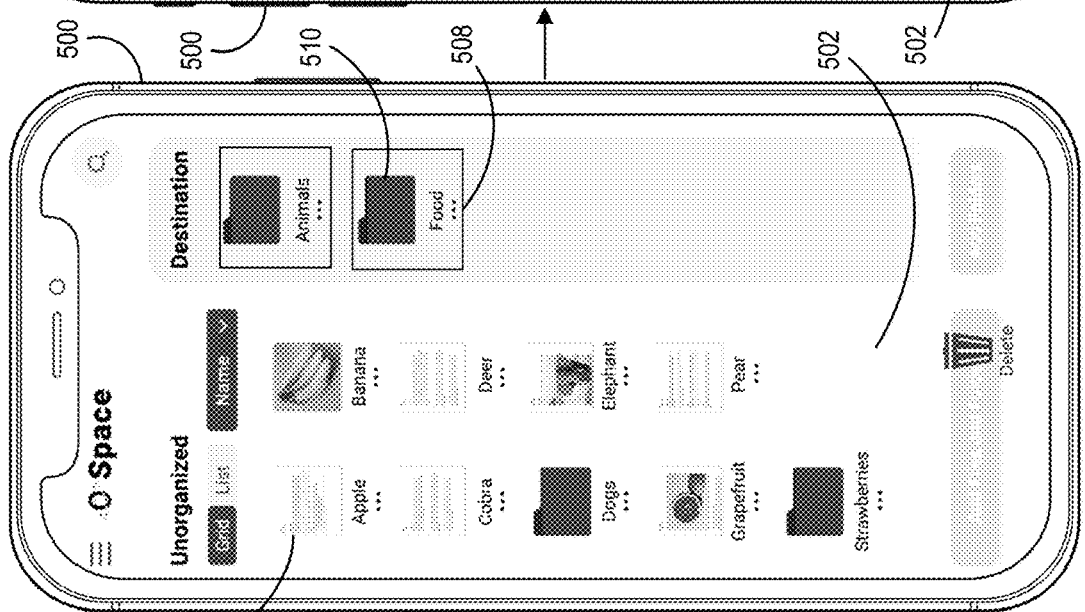
Figure 5C:
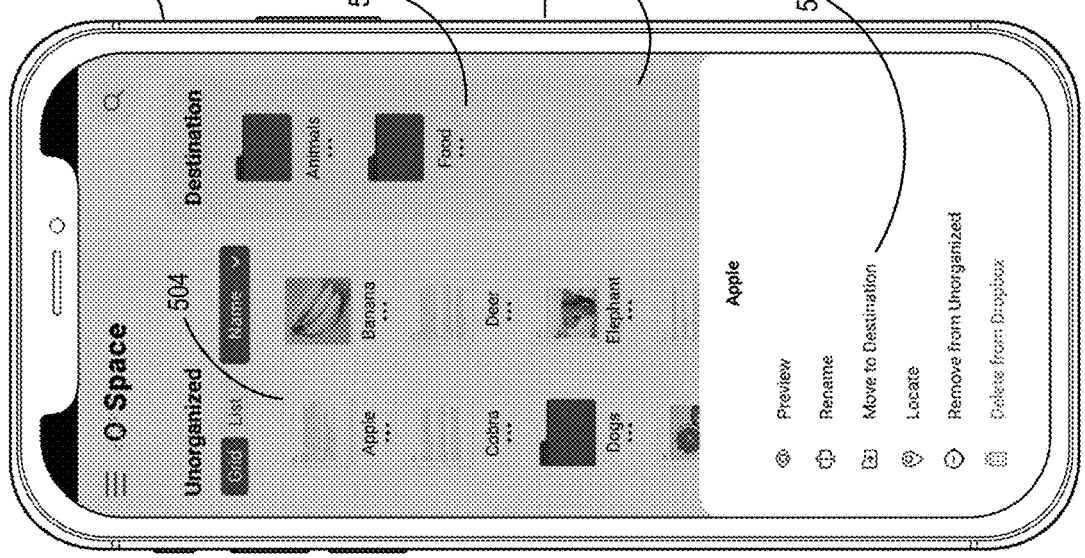

As shown in FIG. 5A, for instance, the file organization system 106 receives a selection of a move option 506 for a digital-content-item icon 504 within a multi-section GUI 502 of a client device 500. Then, as shown in FIG. 5B, the file organization system 106 visually indicates (using a visual indicator 508 with a graphic outline or different color or shade) displayed destination folder icons to prompt a selection of a destination folder icon. Although FIG. 5B illustrates the file organization system 106 visually indicating destination folder icons to prompt a selection of a destination folder icon, the file organization system 106 can prompt or request that a user select a destination folder within the multi-section GUI utilizing various graphical user interface elements (e.g., arrows, shadows, fading portions of the multi-section GUI, text instructions, audio instructions).

Upon receiving a selection of a destination folder, the file organization system 106 can move a selected digital-content-item icon to the selected destination folder. For example, as shown by the transition from FIG. 5B to FIG. 5C, the file organization system 106 moves the digital-content-item icon 504 (e.g., "Apple") to the destination folder icon 510 (e.g., "Food") upon receiving a selection of the destination folder icon 510. In accordance with one or more embodiments herein, the file organization system 106 can modify the underlying file storage structure to reflect the move of the digital-content-item icon 504 to the destination folder icon 510 within the file storage structure. Although one or more embodiments herein illustrate the file organization system 106 moving a digital-content-item icon to a destination folder icon, the file organization system 106 can utilize a move option to move various combinations of digital-content-item icons and/or folder icons to a destination folder icon.

Furthermore, in one or more embodiments, the file organization system 106 can also receive a user interaction (or input) moving a destination folder icon (from a second section) to another destination folder icon within the second section. In particular, the file organization system 106 can visually move the destination folder icon to the other destination folder icon. In addition, based on the user interaction moving the destination folder icon, the file organization system 106 can modify the file storage structure to move a destination folder corresponding to the destination folder icon to another destination folder corresponding to the other destination folder icon. Indeed, in accordance with one or more embodiments herein, the file organization system 106 can utilize various user inputs to move destination folder icons such as drag-and-drop interactions, move option, and/or voice-based inputs.

As also mentioned above, upon receiving a selection of a selectable locate option, the file organization system 106 can display a hierarchical map (or other GUI) to display the digital-content-item icon (and/or folder icon) and its location within a file storage structure. For example, FIGS. 6A-6D illustrate the file organization system 106 displaying various hierarchical maps and other GUIs to depict a digital-content-item icon (and/or folder icon) and its location within a file storage structure. Indeed, upon receiving a selection of the selectable locate option 416 (as shown in FIG. 4), the file organization system 106 displays one of various graphical user interfaces to locate digital-content-item icons and/or folder icons within a file storage structure as illustrated in FIGS. 6A-6D. As further described below, the file organization system 106 can display format options for depicting the digital-content-item icon within a file storage structure in a format for a hierarchical map view, a list view, or a grid view.

For example, as shown in FIG. 6A, the file organization system 106 displays a hierarchical map 604 (e.g., within a GUI 609 of a client device 602) to demonstrate the location of a particular digital-content-item icon 606 within a visualization of a file storage structure. As shown in FIG. 6A, the file organization system 106 displays the digital-content-item icon 606 with edges 608a and 608b to demonstrate that the digital-content-item icon 606 is located within a nested folder 610a and 610b.

Furthermore, in one or more embodiments, the file organization system 106 can display options to expand portions of a hierarchical map view. For example, as shown in FIG. 6A, the file organization system 106 displays a selectable expand-option icon 612 indicating a number of files nested below the selectable expand-option icon 612. Upon selection of the selectable expand-option icon 612, the file organization system 106 can display files and/or folders that are located under the folder icon 614 (via edges).

As another example, as shown in FIG. 6B, the file organization system 106 displays a hierarchical map 616 within a GUI 618 of a client device 620. As shown in FIG. 6B, the file organization system 106 displays the hierarchical map 616 to demonstrate the location of digital-content-item icons (and/or folder icons) and edges to show paths within the file storage structure. As also shown in FIG. 6B, the file organization system 106 can display an expand-option icon 622 to cause a computing device to display files or folders under the connected folder 624 (via edges) as described above.

In both FIGS. 6A and 6B, the file organization system 106 can receive a user interaction to scroll or pan through a hierarchical map (e.g., the hierarchical map 604 and/or the hierarchical map 616). Upon receiving a user interaction to scroll or pan through a hierarchical map, the file organization system 106 can move the hierarchical map to display other portions (e.g., with other folders and files) of the hierarchical map within a GUI of a client device. Furthermore, although FIGS. 6A and 6B demonstrate a location for particular digital-content-item icons and/or folder icons, the file organization system 106 can utilize hierarchical maps to demonstrate locations for various combinations of digital-content-item icons and/or folder icons when a locate option is selected in relation to a digital-content-item icon and/or folder within a multi-section GUI.

As mentioned above, upon receiving a selection of a locate option within a multi-section GUI, the file organization system 106 can also display other GUIs to display the digital-content-item icons (and/or folder icons) and their locations within a file storage structure. For example, as shown in FIG. 6C, the file organization system 106 displays, within a GUI 628 of a client device 630, a location of digital-content-item icons (and folder icons) within a list view 626 of the file storage structure (with a breadcrumb trail GUI element 632 of folders). Moreover, as shown in FIG. 6D, the file organization system 106 displays, within a GUI 636 of a client device 634, a location of digital-content-item icons (and folder icons) within a grid view 638 of the file storage structure (with a breadcrumb trail GUI element 640 of folders).

Figure 6D:
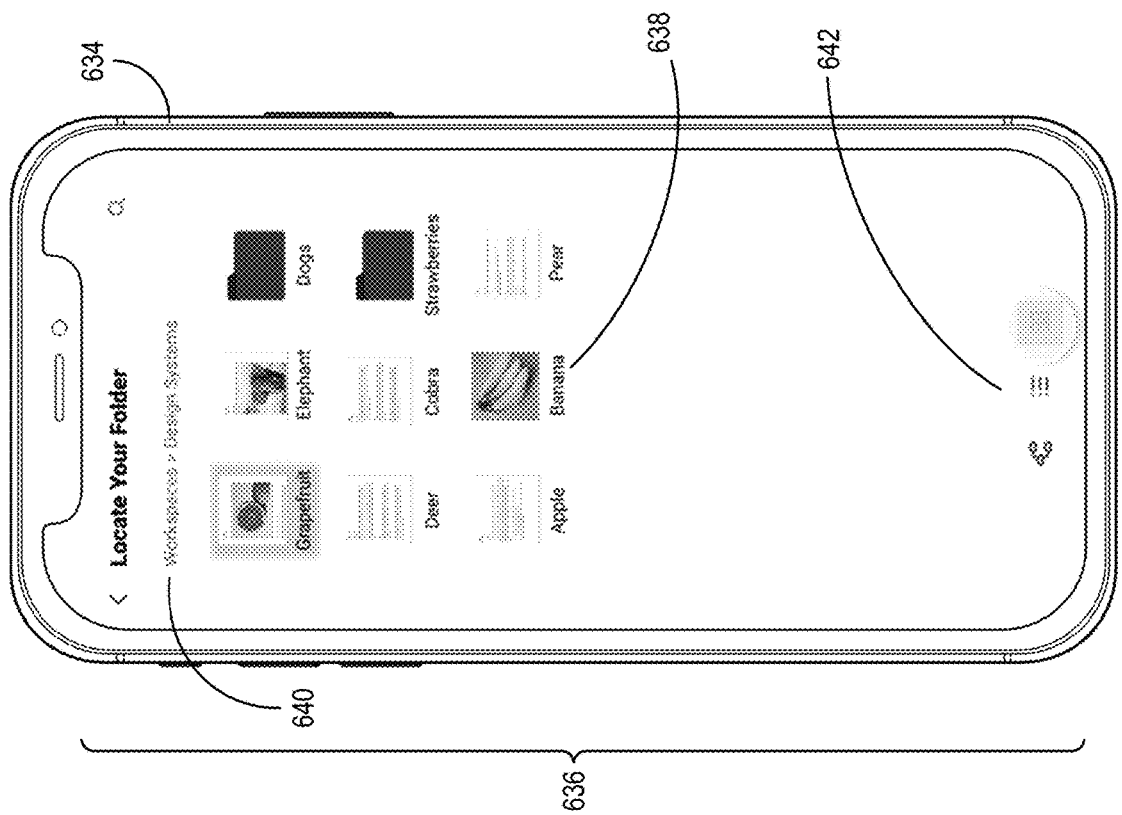
FIGS. 6C and 6D illustrate a file organization system displaying a graphical user interface to locate a digital-content-item icon or folder icon within a file storage structure in accordance with one or more implementations.
Figure 6C:
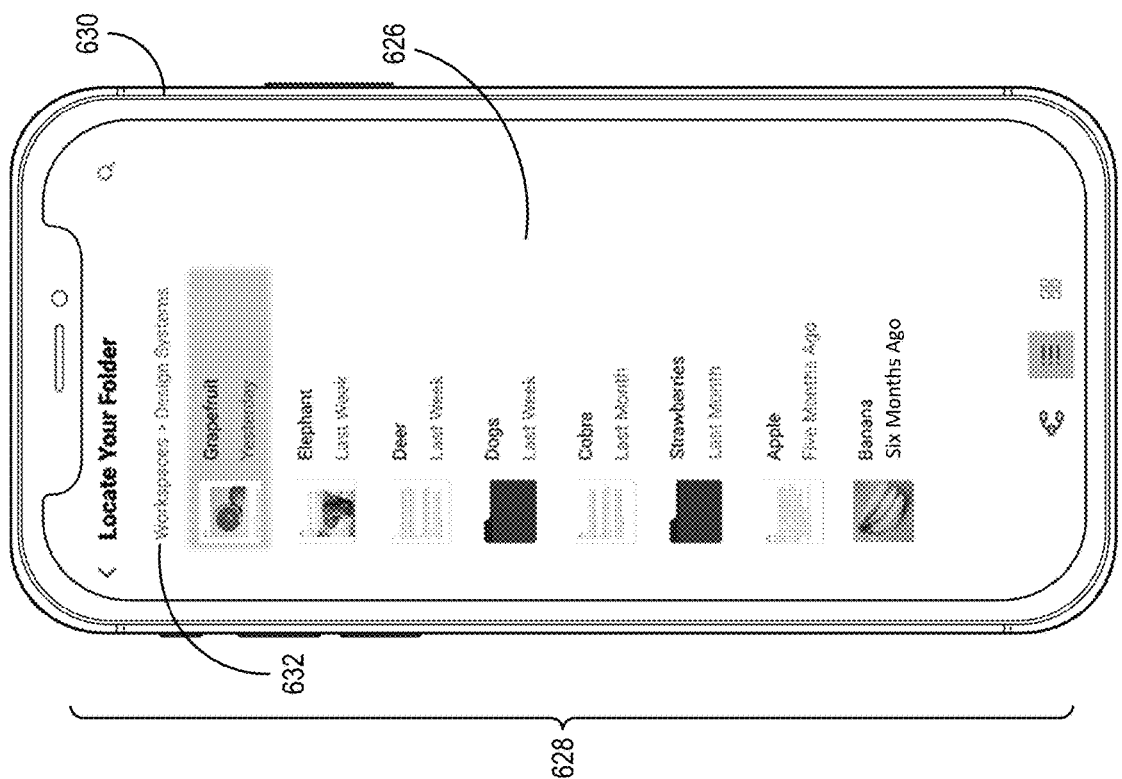

As further shown in FIG. 6D, the file organization system 106 also displays selectable view-option icons 642 to select between a hierarchical map, a list view, and/or a grid view such that the display changes between the hierarchical map, the list view, and/or the grid view for the digital-content-item icons and/or folder icons (as described above). In some instances, the file organization system 106 can utilize various other view modes to demonstrate the location of one or more digital-content-item icons and/or one or more folder icons within a file storage structure.

As previously mentioned, the file organization system 106 can visually move a digital-content-item icon to a folder icon while preserving an underlying file storage structure. For example, the file organization system 106 can visually move a digital-content-item icon without making changes to a corresponding digital content item within the file storage structure. In some instances, the file organization system 106 preserves an underlying file storage structure—regardless or independent of moves of a digital-content-item icon in a multi-section GUI—until a digital organization space displayed within a multi-section GUI is terminated (or saved).

Figure 7:
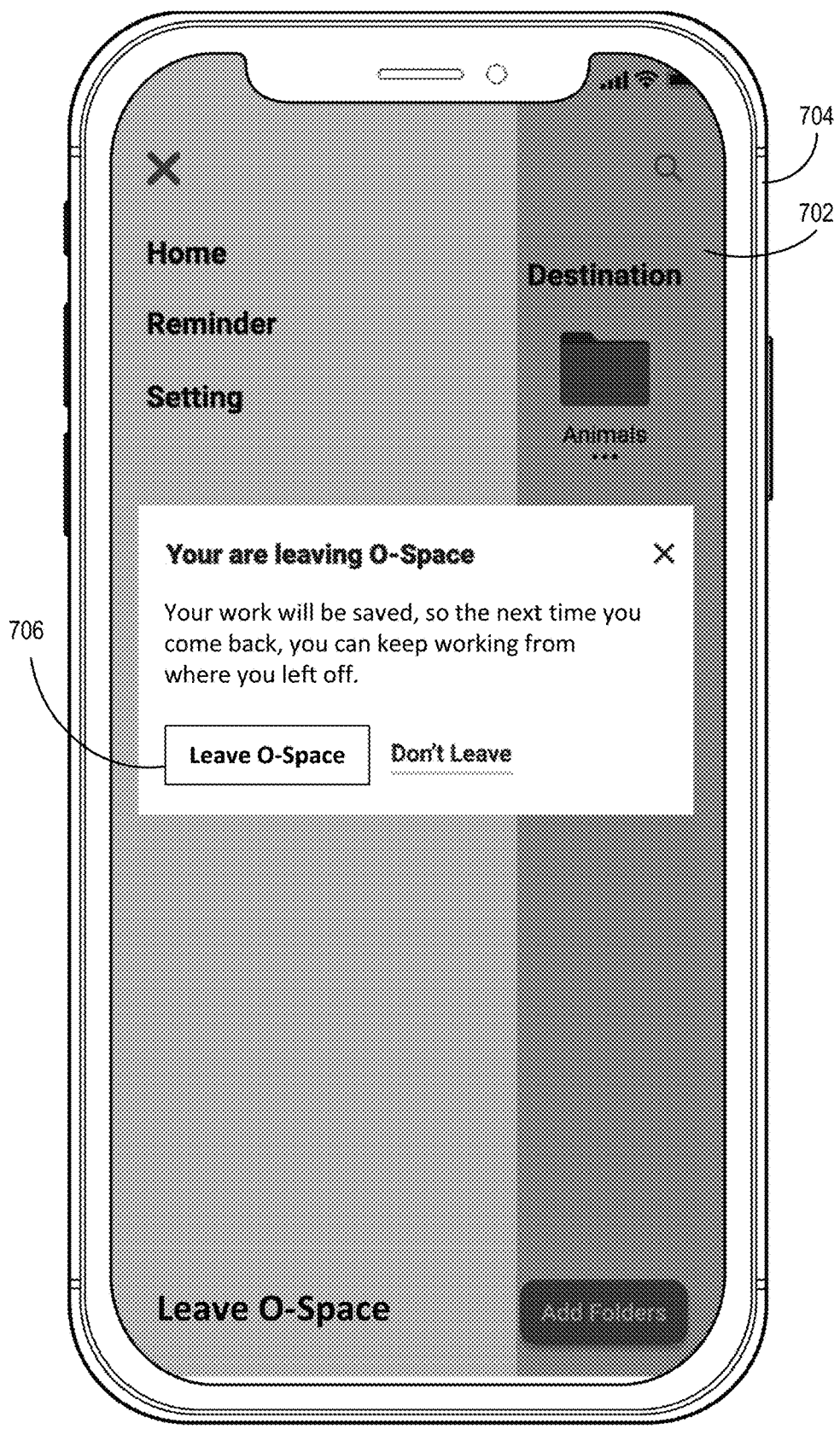
FIG. 7 illustrates a file organization system displaying an option to terminate a digital organization space in accordance with one or more implementations.

In accordance with one or more embodiments, FIG. 7 illustrates the file organization system 106 displaying an option to terminate a digital organization space and a corresponding multi-section GUI. As shown in FIG. 7, the file organization system 106 displays, within a multi-section GUI 702 of a digital organization space of a client device 704, a selectable exit-option icon 706 to terminate the multi-section GUI 702 of the digital organization space. Upon receiving a selection of the selectable exit-option icon 706, the file organization system 106 can terminate the multi-section GUI and change the file storage structure based on the visually moved digital-content-item icons to folder icons (in accordance with one or more embodiments herein) as indicated by user interactions within the multi-section GUI 702 of the digital organization space.

In some embodiments, the file organization system 106 can move digital-content-item icons and/or folder icons to destination folders within a multi-section GUI and remove the digital-content-item icons and/or folder icons from display in a first section of the multi-section GUI while preserving the underlying file storage structure. In particular, the file organization system 106 can make the visual changes on the multi-section GUI without modifying the underlying file storage structure (e.g., to facilitate undo and redo options). Then, upon receiving a user interaction to exit the multi-section GUI, the file organization system 106 can finalize one or more moves of digital content items and folders to destination folders—corresponding to one or more digital-content-item icons and folder icons to destination folder icons—in the underlying file storage structure.

Furthermore, upon terminating (or exiting) the multi-section GUI of the digital organization space, the file organization system 106 can also save the visual placements of one or more digital-content-item icons and/or folder icons within the multi-section GUI. Indeed, upon receiving a user interaction to open (e.g., reopen) the multi-section GUI, the file organization system 106 can open (or display) the multi-section GUI. Upon opening (e.g., reopening) the multi-section GUI of the digital organization space, the file organization system 106 can display the digital-content-item icons and folder icons that were previously displayed in one or both sections of the multi-section GUI. For example, the file organization system 106 can display the remaining digital-content-item icons, remaining folder icons, and/or destination folder icons as they were prior to terminating the multi-section GUI. Indeed, the multi-section GUI of the digital organization space can operate as a savable environment that facilitates the continued organization of files of the file storage structure in light of previous activity within the digital organization space (displayed within a multi-section GUI).

In some embodiments, the file organization system 106 can display a selectable option to save changes from the multi-section GUI to the file storage structure. For example, upon receiving a selection of the selectable option to save changes (e.g., a save command), the file organization system 106 can modify the file storage structure according to the moves of the digital-content-item icons (or folder icons) from a first section to the destination folders of a second section within a multi-section GUI. In some cases, the file organization system 106 can automatically carry over changes in the multi-section GUI to the file storage structure (e.g., periodically modifying the file storage structure after changes in the multi-section GUI to act as an auto save function).

Additionally, in one or more embodiments, the file organization system 106 can provide one or more reminder functionalities in relation to a digital organization space within a multi-section GUI. For example, as shown in FIG. 8A, the file organization system 106 displays a menu option 802 that leads to opening a reminder GUI within or corresponding to a multi-section GUI 804 of a client device 806. Indeed, as shown in FIG. 8B, upon receiving a selection of the menu option 802 (e.g., receiving a selection of reminders from the menu option 802), the file organization system 106 can display, within a reminder GUI 807, reminder-add option 808 to generate reminders (e.g., reminders 810 and 812) for the digital organization space of the multi-section GUI.

Figure 8B:
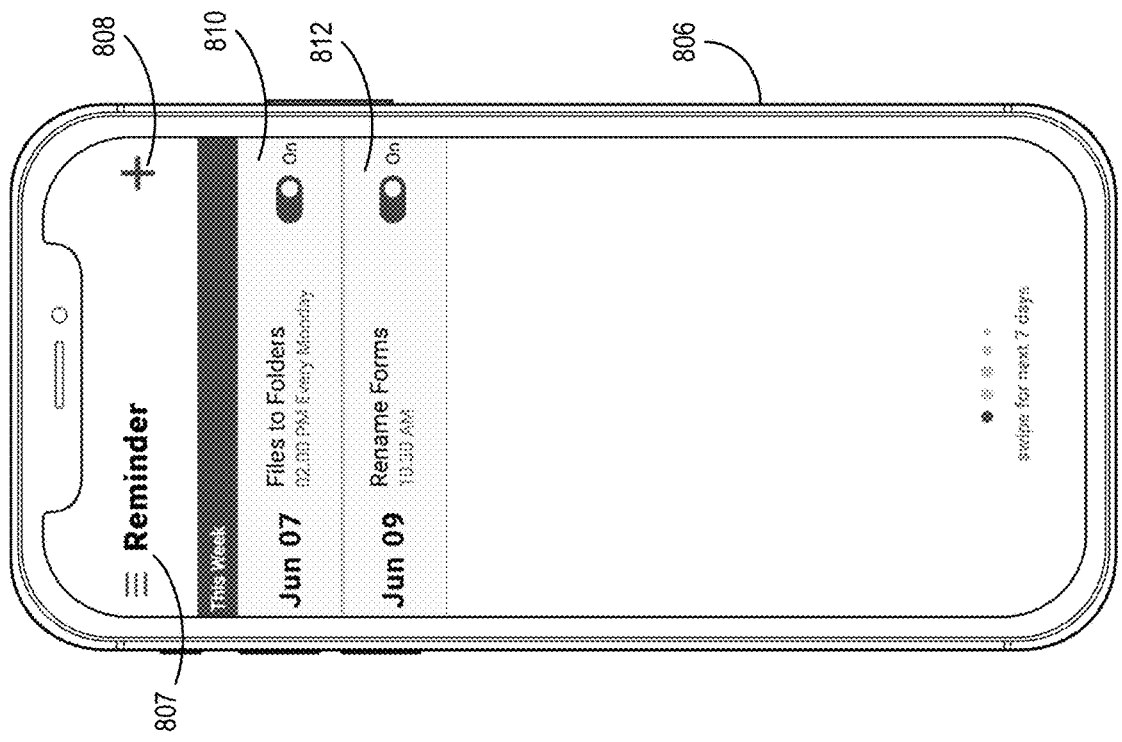
FIGS. 8A and 8B illustrate a file organization system displaying reminder functionalities in relation to a digital organization space within a multi-section GUI in accordance with one or more implementations.
Figure 8A:
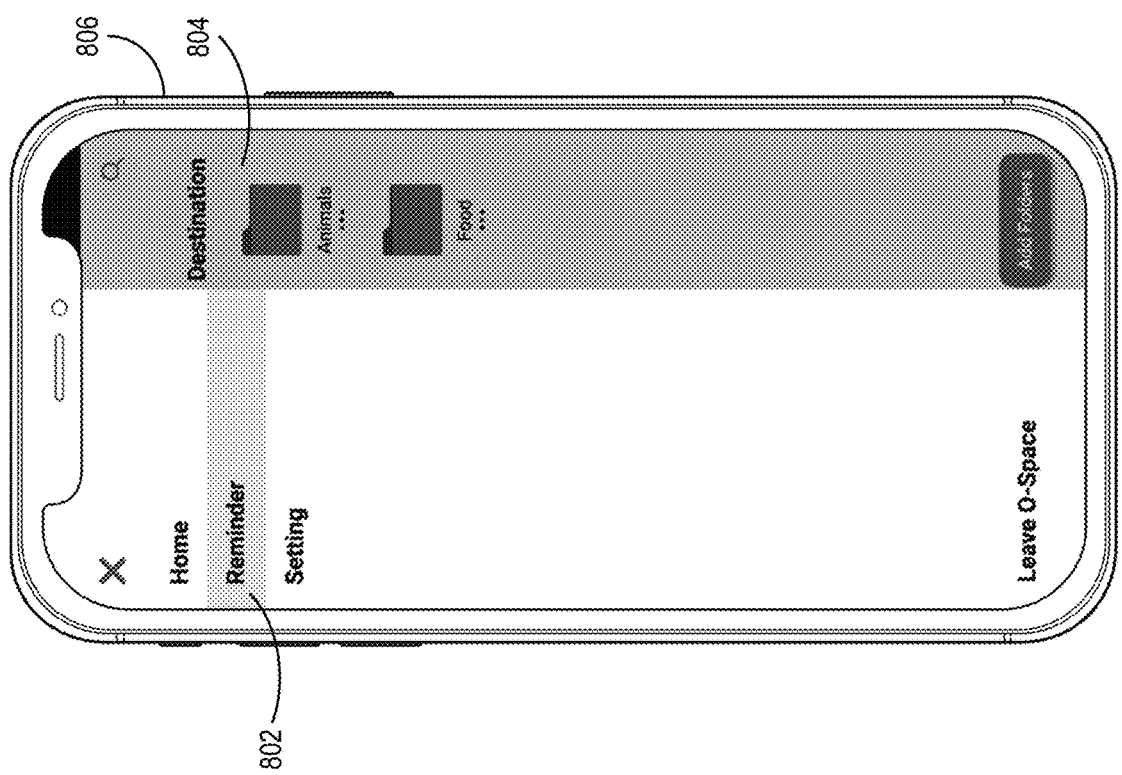

In relation to FIG. 8B, the file organization system 106 can receive user input to schedule a reminder for organizing digital content items (e.g., files to folders) within the file storage structure (e.g., a reminder 810). For example, the file organization system 106 can receive user inputs indicating a time and date for the reminder 810. Then, upon identifying a date and time that matches the date and time of the reminder 810, the file organization system 106 can display a reminder to organize files within the digital organization space. Indeed, in one or more embodiments, the file organization system 106 transmits an electronic communication for the reminder to organize digital content items and/or folders with a link to access the multi-section GUI of the digital organization space. For example, the electronic communication can include, but is not limited to, a popup communication, a push notification, an SMS and/or instant message, and/or an e-mail.

In some embodiments, as shown in FIG. 8B, the file organization system 106 receives user inputs to schedule a reminder to rename digital content items (or folders) within the file storage structure (e.g., a reminder 812). Indeed, the file organization system 106 can receive user inputs indicating a time and date for the reminder 812. Subsequently, upon identifying a date and time that matches the date and time of the reminder 812, the file organization system 106 can display a reminder to rename forms (or files) within the digital organization space. In one or more embodiments, the file organization system 106 transmits an electronic communication for the reminder to rename digital content items and/or folders as described above.

Moreover, in some embodiments, the file organization system 106 can receive user inputs to generate a reminder to remove digital content items (or folders) within the file storage structure. Indeed, the file organization system 106 can receive user inputs indicating a time and date for the reminder to remove digital content items (or folders). Subsequently, upon identifying a date and time that matches the date and time of the created reminder, the file organization system 106 can display a reminder to remove digital content items within the digital organization space. In some embodiments, the file organization system 106 transmits an electronic communication for the reminder to remove digital content items and/or folders as described above.

In some implementations, the file organization system 106 can determine that a time for a scheduled reminder has arrived for organizing digital content items and, in response, automatically populate a digital organization space with digital-content-item icons, folder icons, and/or destination folder icons (e.g., by auto-populating a list of file icons and destination folder icons). In particular, the file organization system 106 can initially identify digital content items, folders, and/or destination folders for the multi-section GUI. Then, upon displaying the multi-section GUI (e.g., in response to a reminder), the file organization system 106 can auto populate the multi-section GUI with digital-content-item icons, folder icons, and/or destination folder icons for the identified digital content items, folders, and/or destination folders. In certain instances, the file organization system 106 can auto populate the digital-content-item icons, folder icons, and/or destination folder icons within a selection user interface to add one or more of the digital-content-item icons, folder icons, and/or destination folder icons to the multi-section GUI and/or can directly auto populate the multi-section GUI with the digital-content-item icons, folder icons, and/or destination folder icons.

In some instances, the file organization system 106 can prioritize the digital-content-item icons, folder icons, and/or destination folder icons (e.g., based on a rank determined from user activity, size, modification dates, content views) while populating the multi-section GUI of the digital organization space. For example, the file organization system 106 can display a higher ranked digital-content-item icon first in comparison to a lower ranked digital-content-item icon within the multi-section GUI.

For instance, in some embodiments, the file organization system 106 can, based on determining that a time for a scheduled reminder has arrived for organizing digital content items, automatically identify digital content items to display within a first section of a multi-section GUI. In some cases, the file organization system 106 also or alternatively automatically prioritizes (e.g., in a list) digital content items to be organized and/or suggested destination folders when (or before) the time for the scheduled reminder arrives. In particular, the file organization system 106 can utilize a machine learning model that predicts that a digital content item is misplaced within the file storage structure or duplicative of another digital content item within the file storage structure (to include the digital content item within the multi-section GUI). For example, the file organization system 106 can utilize a machine learning model to evaluate metadata, content, and/or characteristics (e.g., file type, size, author, creation date) of digital content items and their storage locations within the file storage structure to determine whether the digital content items are misplaced and/or duplicative. Indeed, in some embodiments, the machine learning model outputs a probability indicating the likelihood of a digital content item being misplaced and/or duplicative. Then, the file organization system 106 utilizes the probability to determine whether to automatically provide the digital content item in the multi-section GUI based on the probability value satisfying a threshold probability.

In some embodiments, the file organization system 106 trains the machine learning model to predict whether a digital content item is misplaced and/or duplicative by utilizing historical file organization activities that include historical data on ground truth selections of digital content items as misplaced (or duplicative) through user selections (e.g., within a multi-section GUI of the digital organization space). For example, the file organization system 106 can utilize one or more historical digital content items with the machine learning model to determine probability values of the historical digital content items being misplaced and/or duplicative. Then, the file organization system 106 can compare the predicted probability values with the ground truth historical data indicating whether the same digital content items were selected as misplaced or duplicative by historical user selections to determine a loss value between the predictions and the ground truth data. The loss can indicate the accuracy at which the machine learning model correctly predicts that a digital content item is misplaced and/or duplicative within a file storage structure. Then, the file organization system 106 can utilize the loss to train the machine learning model (e.g., adjusting or learning parameters of the model, back propagation).

Additionally, in some embodiments, the file organization system 106 can, based on determining that a time for a scheduled reminder has arrived for organizing digital content items, automatically identify folders to display within a second section of a multi-section GUI. For example, the file organization system 106 can utilize one or more digital content items (or folders) corresponding to a first section of the multi-section GUI to automatically identify folders to display within the second section of the multi-section GUI. In particular, in some embodiments, the file organization system 106 automatically identifies the one or more folders based on similarities between the one or more digital content items (or folders) represented in the first section and digital content items corresponding to (or existing within) the one or more candidate destination folders for the second section of the multi-section GUI.

To illustrate, the file organization system 106 can utilize a machine learning model to determine similarities between the one or more digital content items (or folders) and digital content items corresponding to the one or more candidate destination folders. Upon identifying a number of candidate destination folders that satisfy a threshold similarity (e.g., based on a cosine similarity, Euclidian distance similarity, other similarity score) with one or more of the one or more digital content items (or folders) from the first section of the multi-section GUI. Then, the file organization system 106 can display, within the second section of the multi-section GUI, folder icons for the identified candidate destination folders that satisfy a threshold similarity.

In some embodiments, the file organization system 106 trains the machine learning model to predict whether a candidate destination folder matches with misplaced and/or duplicative digital content items by utilizing historical file organization activities that include historical data on ground truth movements of misplaced (or duplicative) digital content items to destination folders (within the multi-section GUI of the digital organization space or a file storage structure management user interface). For example, the file organization system 106 can utilize the candidate destination folders with the machine learning model to determine similarities between misplaced and/or duplicative digital content items and candidate destination folders. Subsequently, the file organization system 106 can compare the predicated similarities with the ground truth historical data indicating whether the particular digital content items were moved to the particular destination folders by historical user activities to determine a loss value between the predictions and the ground truth data. For instance, the loss can indicate the accuracy at which the machine learning model correctly predicts candidate destination folders as relevant for particular digital content items (or folders). Then, the file organization system 106 can utilize the loss to train the machine learning model (e.g., adjusting or learning parameters of the model, back propagation).

Although one or more embodiments illustrates auto populating in response to a scheduled reminder, the file organization system 106 can auto populate digital content items and/or folders within a first and/or second section of the multi-section GUI without a reminder. For example, the file organization system 106 can auto populate digital content items and/or folders within the first and second section of the multi-section GUI (in accordance with one or more implementations) upon receiving a user interaction to open the multi-section GUI. In some embodiments, the file organization system 106 can auto populate digital content items and/or folders within the first and second section of the multi-section GUI upon receiving a user interaction with a selectable option to auto populate the multi-section GUI.

In some embodiments, the file organization system 106 can also auto populate the digital content items and/or folders within the first and second section of the multi-section GUI based on user flagged files and/or folders within a file storage structure. For example, the file organization system 106 can detect or receive user interactions within the file storage structure that flag files and/or folders as files and/or folder to organize (e.g., a user flagging files while browsing the file storage structure in a file storage structure management interface). Then, upon opening the multi-section GUI, the file organization system 106 can populate (or display) the flagged files and/or folders as digital-content-item icons and/or folder icons within the multi-section GUI (in accordance with one or more embodiments herein).

Figure 9:
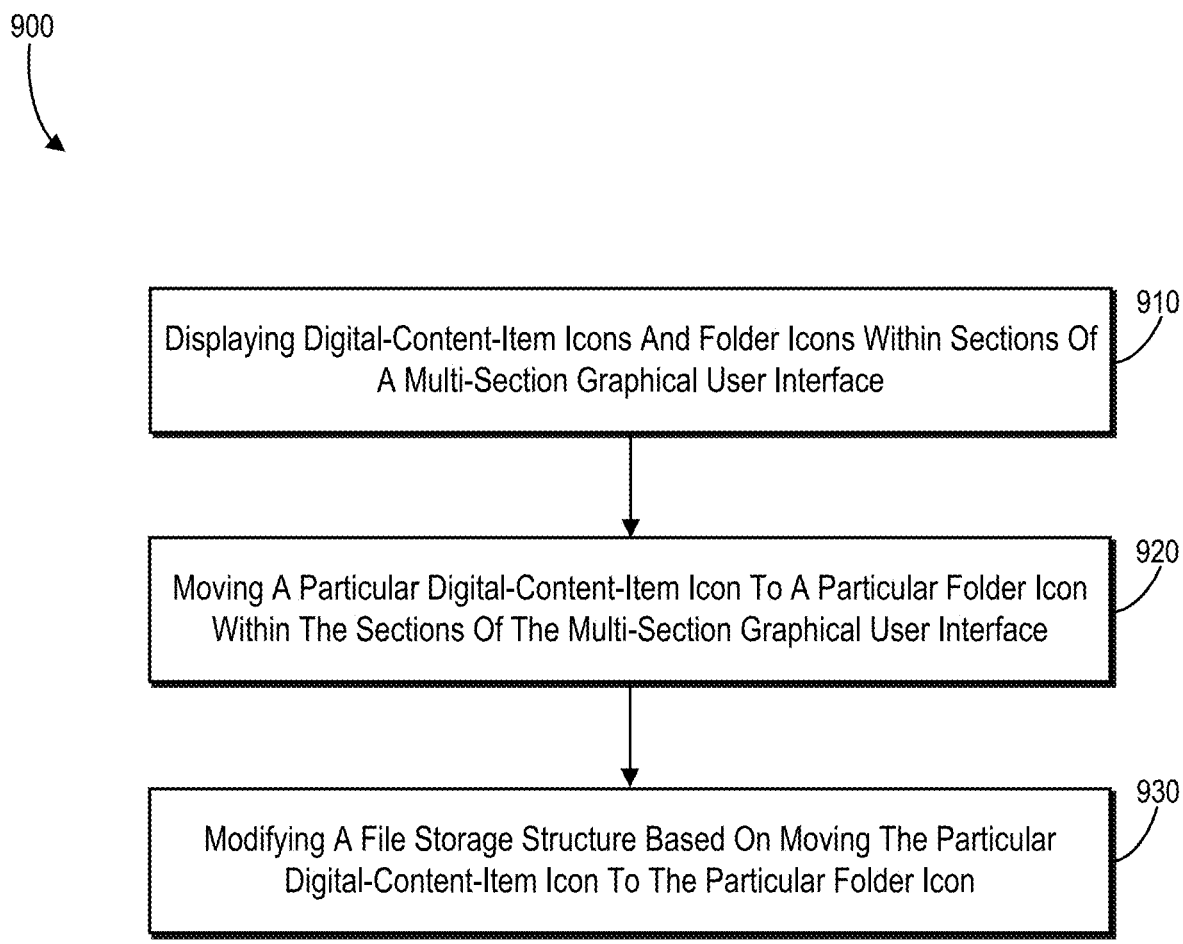
FIG. 9 illustrates a flowchart of a series of acts for displaying a multi-section graphical user interface to modify a file storage structure in accordance with one or more implementations.

FIGS. 1-8, the corresponding text, and the examples provide a number of different methods, systems, devices, and non-transitory computer-readable media of the file organization system 106. In addition to the foregoing, one or more implementations can also be described in terms of flowcharts comprising acts for accomplishing a particular result, as shown in FIG. 9. The acts shown in FIG. 9 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 9. In some implementations, a system can be configured to perform the acts of FIG. 9. Alternatively, the acts of FIG. 9 can be performed as part of a computer-implemented method.

FIG. 9 illustrates a flowchart of a series of acts 900 for displaying (or causing the display of) a multi-section graphical user interface to modify a file storage structure in accordance with one or more implementations. While FIG. 9 illustrates acts according to one implementation, alternative implementations may omit, add to, reorder, and/or modify any of the acts shown in FIG. 9.

As shown in FIG. 9, the series of acts 900 include an act 910 of displaying (or causing the display of) digital-content-item icons and folder icons within sections of a multi-section graphical user interface. In particular, the act 910 can include displaying (or causing the display of), within a first section of a multi-section graphical user interface, one or more digital-content-item icons corresponding to one or more digital content items from a file storage structure. For example, a first section of a multi-section graphical user interface can include an organization-target section for digital content items or folders to be organized within a file storage structure. Furthermore, in some instances, one or more digital-content-item icons can be associated with digital content items from different folder locations of the file storage structure. In certain implementations, a digital-content-item icon can include an additional folder icon corresponding to an additional folder from the file storage structure.

Additionally, the act 910 can include displaying (or causing the display of), within a second section of a multi-section graphical user interface, one or more folder icons corresponding to one or more folders from a file storage structure. For instance, a second section of a multi-section graphical user interface can include a destination section for folders as destinations within a file storage structure for digital content items or folders from an organization-target section. In certain instances, the act 910 includes displaying (or causing the display of), within a first section of a multi-section graphical user interface, one or more additional folder icons corresponding to additional folders from a file storage structure.

Furthermore, the act 910 can include identifying one or more digital content items and one or more folders from a file storage structure. In some embodiments, the act 910 includes receiving a selection of one or more digital content items for display within a first section of a multi-section graphical user interface and/or receiving a selection of one or more folders for display within a second section of a multi-section graphical user interface. Additionally, the act 910 can include automatically identifying one or more digital content items utilizing a machine learning model that predicts that a digital content item is misplaced within a file storage structure or duplicative of another digital content item within the file storage structure. Moreover, the act 910 can include automatically identifying one or more folders based on similarities between one or more digital content items and digital content items corresponding to the one or more folders.

In some cases, the act 910 further includes displaying (or causing the display of) a reminder-generation option for generating reminders and receiving user input to schedule a reminder for organizing digital content items, removing digital content items, or renaming digital content items within a file storage structure. Furthermore, the act 910 can include determining a time for a scheduled reminder has arrived for organizing digital content items and, based on determining the time for the scheduled reminder has arrived, automatically identifying digital content items to display within a first section of a multi-section graphical user interface. In some cases, the act 910 includes determining a time for a scheduled reminder has arrived for organizing digital content items and, based on determining the time for the scheduled reminder has arrived, automatically identifying folders to display within a second section of a multi-section graphical user interface.

Moreover, the act 910 can include displaying (or causing the display of), within a first section of a multi-section graphical user interface, a locate option associated with a particular digital-content-item icon. In addition, the act 910 can include, based on a user interaction with a locate option, display (or causing the display of), within a file-location-graphical-user interface, a hierarchy map including a particular digital-content-item icon and one or more edges connecting the particular digital-content-item icon to a parent-folder icon corresponding to a parent folder of the digital content item within a file storage structure.

As further shown in FIG. 9, the series of acts 900 include an act 920 of moving a particular digital-content-item icon to a particular folder icon within the sections of a multi-section graphical user interface. In particular, the act 920 can include, based on a user interaction with a particular digital-content-item icon, moving the particular digital-content-item icon from a first section of a multi-section graphical user interface to a particular folder icon from a second section of a multi-section graphical user interface. In some instances, the act 920 includes moving a particular digital-content-item icon to a particular folder icon while preserving a file storage structure. Accordingly, the file storage structure is preserved while moving the particular digital-content-item icon to the particular folder icon. Furthermore, the act 920 can include, based on a user interaction with an additional folder icon, moving the additional folder icon from a first section of a multi-section graphical user interface to an additional folder icon from a second section of the multi-section graphical user interface. For example, a user interaction with a particular digital-content-item icon can include a drag-and-drop interaction with the particular digital-content-item icon. In some embodiments, the act 920 includes, based on a user interaction with multiple digital-content-item icons, moving the multiple digital-content-item icons from a first section of the multi-section graphical user interface to a particular folder icon from a second section of the multi-section graphical user interface.

Moreover, the act 920 can include receiving a user input associating a particular digital-content-item icon from a first section with a particular folder icon from a second section of a multi-section graphical user interface. For example, the user input can include a voice-command input, a drag-and-drop input, or a move-option-icon selection to move a digital-content-item icon.

As further shown in FIG. 9, the series of acts 900 include an act 930 of modifying a file storage structure based on moving the particular digital-content-item icon to the particular folder icon. In particular, the act 930 can include, based on moving a particular digital-content-item icon from a first section to a particular folder icon from a second section, modifying a file storage structure to associate a digital content item corresponding to the particular digital-content-item icon with a folder corresponding to the particular folder icon. In some embodiments, the act 930 includes, based on moving multiple digital-content-item icons from a first section to a particular folder icon from a second section, modifying a file storage structure to associate multiple digital content items corresponding to the multiple digital-content-item icons with a folder corresponding to the particular folder icon. Additionally, the act 930 can include, based on a user input associating a particular digital-content-item icon from a first section with a particular folder icon from a second section, modifying a file storage structure to associate a digital content item corresponding to the particular digital-content-item icon with a folder corresponding to the particular folder icon.

Moreover, the act 930 can include modifying a file storage structure to associate a digital content item with a folder based on a user selection to terminate a digital organization space corresponding to a multi-section graphical user interface. Accordingly, the file storage structure is modified based on a user selection to terminate a digital organization space corresponding to the multi-section graphical user interface. In some embodiments, the act 930 includes terminating a display (or causing the termination of the display) of a multi-section graphical user interface. In addition, the act 930 can include receiving a user interaction to open a multi-section graphical user interface. Furthermore, the act 930 can include, based on receiving a user interaction to open the multi-section graphical user interface, displaying (or causing the display of), within a first section of the multi-section graphical user interface, remaining digital-content-item icons from one or more digital-content-item icons.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
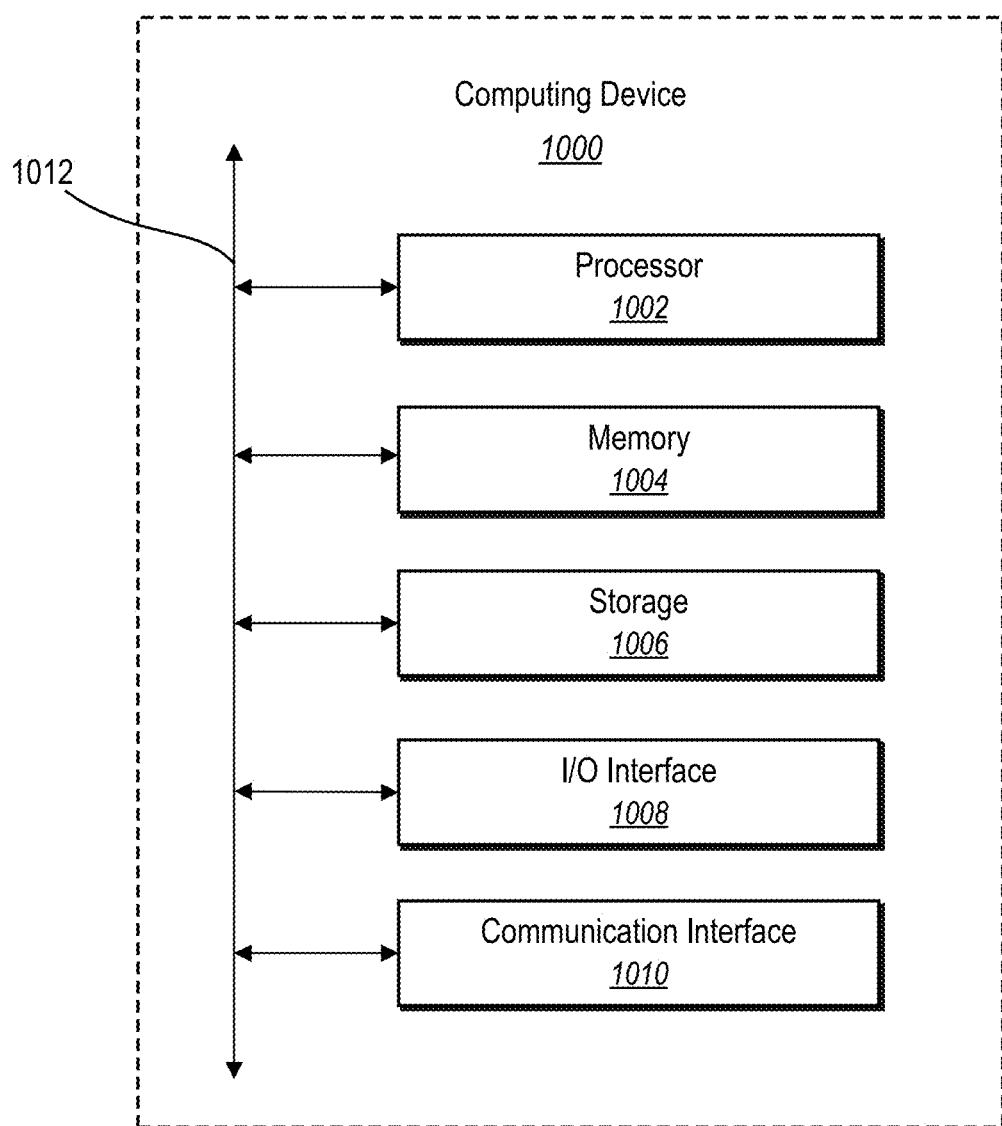
FIG. 10 illustrates a block diagram of an exemplary computing device in accordance with one or more implementations.

FIG. 10 illustrates a block diagram of exemplary computing device 1000 that may be configured to perform one or more of the processes described above. One will appreciate that server device(s) 102 and/or client devices 112a-112n may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular embodiments, storage device 1006 is non-volatile, solid-state memory. In other embodiments, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
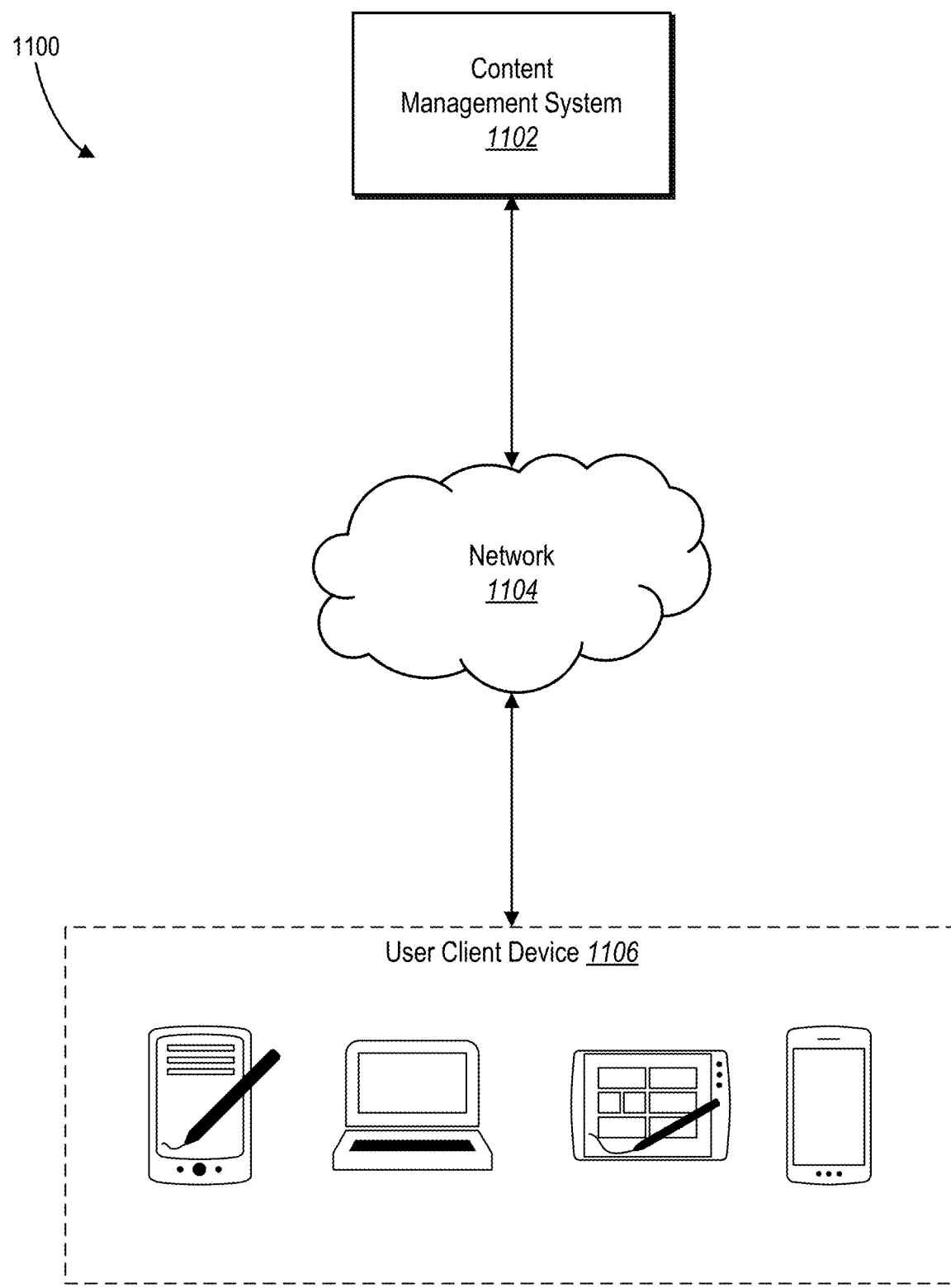
FIG. 11 illustrates an example environment of a networking system in accordance with one or more implementations.

FIG. 11 is a schematic diagram illustrating environment 1100 within which one or more embodiments of content management system 104 can be implemented. Content management system 1102 may generate, store, manage, receive, and send digital content (such as digital videos). For example, content management system 1102 may send and receive digital content to and from client devices 1106 by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices 1106 associated with one or more users. For example, a user may edit digital content using client device 1106. The content management system 1102 can cause client device 1106 to send the edited digital content to content management system 1102. Content management system 1102 then synchronizes the edited digital content on one or more additional computing devices.

In addition to synchronizing digital content across multiple devices, one or more embodiments of content management system 1102 can provide an efficient storage option for users that have large collections of digital content. For example, content management system 1102 can store a collection of digital content on content management system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full- or high-resolution version of digital content from content management system 1102. In particular, upon a user selecting a reduced-sized version of digital content, client device 1106 sends a request to content management system 1102 requesting the digital content associated with the reduced-sized version of the digital content. Content management system 1102 can respond to the request by sending the digital content to client device 1106. Client device 1106, upon receiving the digital content, can then present the digital content to the user. In this way, a user can have access to large collections of digital content while minimizing the number of resources used on client device 1106.

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox for iPhone or iPad, Dropbox for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access content management system 1102.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   cause display, within a first section of a multi-section graphical user interface, of one or more digital-content-item icons corresponding to one or more digital content items from a file storage structure of a content management system;
   cause display, within a second section of the multi-section graphical user interface, of one or more folder icons corresponding to one or more folders from the file storage structure of the content management system;
   based on a user interaction with a plurality of digital-content-item icons:
      cause a first visual movement of a first particular digital-content-item icon from the first section of the multi-section graphical user interface to a first particular folder icon from the second section of the multi-section graphical user interface while preserving a first path directory location of a first folder in the file storage structure visually represented by the first particular folder icon;
      cause a second visual movement of a second particular digital-content-item icon from the first section of the multi-section graphical user interface to a second particular folder icon from the second section of the multi-section graphical user interface while preserving a second path directory location of a second folder in the file storage structure visually represented by the second particular folder icon, wherein the second path directory location is different from the first path directory location; and
      remove the first particular digital-content-item icon and the second particular digital-content-item icon from display in the first section of the multi-section graphical user interface while preserving a first original path directory location of a first digital-content-item corresponding the first particular digital-content-item icon and a second original path directory location of a second digital-content-item corresponding to the second particular digital-content-item icon within the file storage structure of the content management system;
   detect a user selection to terminate a digital organization space corresponding to the multi-section graphical user interface; and
   based on moving the first particular digital-content-item icon from the first section to the first particular folder icon from the second section and the second particular digital-content-item icon from the first section to the second particular folder icon from the second section and the user selection to terminate the digital organization space, modify the file storage structure of the content management system to move a first digital content item corresponding to the first particular digital-content-item icon within the first path directory location of the first folder corresponding to the first particular folder icon and to move a second digital content item corresponding to the second particular digital-content-item icon within the second path directory location of the second folder corresponding to the second particular folder icon based on the first visual movement and the second visual movement within the digital organization space.

2. The non-transitory computer-readable medium of claim 1, further comprising instructions that, when executed by the at least one processor, cause the computing device to:
   automatically identifying digital content items to display within the first section of the multi-section graphical user interface; and
   automatically identify folders to display within the second section of the multi-section graphical user interface.

3. The non-transitory computer-readable medium of claim 1, further comprising instructions that, when executed by the at least one processor, cause the computing device to, in response to modifying the file storage structure of the content management system, synchronize the file storage structure of the content management system on one or more computing devices associated with the one or more digital content items and the one or more folders.

4. The non-transitory computer-readable medium of claim 1, further comprising instructions that, when executed by the at least one processor, cause the computing device to:
   cause display, within the multi-section graphical user interface, an exit option to terminate a digital organization space corresponding to the multi-section graphical user interface and a remain option to maintain the digital organization space;
   detect a user selection of the exit option to terminate the digital organization space; and
   based on the user selection of the exit option to terminate the digital organization space, modify the file storage structure of the content management system to move the first digital content item corresponding to the first particular digital-content-item icon within the first path directory location of the first folder corresponding to the first particular folder icon and to move the second digital content item corresponding to the second particular digital-content-item icon within the second path directory location of the second folder corresponding to the second particular folder icon based on the first visual movement and the second visual movement within the digital organization space.

5. The non-transitory computer-readable medium of claim 1, further comprising instructions that, when executed by the at least one processor, cause the computing device to:

receive a selection of the one or more digital content items for display within the first section of the multi-section graphical user interface; and receive a selection of the one or more folders for display within the second section of the multi-section graphical user interface.

6. The non-transitory computer-readable medium of claim 1, wherein:

the first section of the multi-section graphical user interface comprises an organization-target section for digital content items or folders to be organized within the file storage structure; and the second section of the multi-section graphical user interface comprises a destination section for folders as destinations within the file storage structure for the digital content items or folders from the organization-target section.

7. The non-transitory computer-readable medium of claim 1, further comprising instructions that, when executed by the at least one processor, cause the computing device to:

cause display, within the first section of the multi-section graphical user interface, of a locate option associated with the first particular digital-content-item icon; and based on a user interaction with the locate option, cause display, within a file-location-graphical-user interface, of a hierarchy map comprising the first particular digital-content-item icon and one or more edges connecting the first particular digital-content-item icon to a parent-folder icon corresponding to a parent folder of the first digital content item within the file storage structure of the content management system.

8. The non-transitory computer-readable medium of claim 1, further comprising instructions that, when executed by the at least one processor, cause the computing device to save the digital organization space, within the content management system, by saving visual placements of the one or more digital-content-item icons within the first section of the multi-section graphical user interface and the one or more folder icons within the second section of the multi-section graphical user interface based on the user interaction with the plurality of digital-content-item icons in the multi-section graphical user interface while preserving the file storage structure of the content management system.

9. The non-transitory computer-readable medium of claim 1, further comprising instructions that, when executed by the at least one processor, cause the computing device to preserve the file storage structure of the content management system on both the computing device and a cloud storage device of the content management system.

10. A system comprising at least one non-transitory computer-readable storage medium storing a software application with instructions that, when executed by a client device, cause the client device to:

display, within a first section of a multi-section graphical user interface of a digital organization space, of one or more digital-content-item icons corresponding to one or more digital content items from a file storage structure of a content management system;

display, within a second section of a multi-section graphical user interface of the digital organization space, of one or more folder icons corresponding to one or more folders from the file storage structure of the content management system;

based on a user input associating a particular digital-content-item icon from the first section with a particular folder icon from the second section:

cause a visual movement of the particular digital-content-item icon from the first section of the multi-section graphical user interface to the particular folder icon from the second section of the multi-section graphical user interface;

remove the particular digital-content-item icon from display in the first section of the multi-section graphical user interface while preserving the file storage structure; and save the digital organization space, within the content management system, by separately saving the visual movement of the particular digital-content-item icon within the multi-section graphical user interface while preserving path directory locations of the one or more folders and the one or more digital content items in the file storage structure of the content management system; and based on a user selection with a selectable option to save changes from the digital organization space corresponding to the multi-section graphical user interface to the file storage structure of the content management system, modify the file storage structure to associate a digital content item corresponding to the particular digital-content-item icon with a folder corresponding to the particular folder icon.

11. The system of claim 10, wherein the user input comprises a voice-command input, a drag-and-drop input, or a move-option-icon selection to move the particular digital-content-item icon.

12. The system of claim 10, wherein the software application further comprises instructions that, when executed by the client device, cause the client device to:

utilize a machine learning model to identify one or more misplaced digital content items within the file storage structure; and automatically populate the first section of the multi-section graphical user interface with the one or more digital-content-item icons based on the one or more misplaced digital content items identified by the machine learning model.

13. The system of claim 10, wherein the software application further comprises instructions that, when executed by the client device, cause the client device to:

based on the user selection with the selectable option to save changes, terminate the digital organization space corresponding to the multi-section graphical user interface;

receive a user interaction to reopen the multi-section graphical user interface of the digital organization space; and based on the user interaction to reopen the multi-section graphical user interface of the digital organization space, display, within the first section of the multi-section graphical user interface, remaining digital-content-item icons from the one or more digital-content-item icons based on the removal of the particular digital-content-item icon from display in the first section of the multi-section graphical user interface.

14. The system of claim 10, wherein the software application further comprises instructions that, when executed by the client device, cause the client device to:

receive a selection of the one or more digital content items for display within the first section of the multi-section graphical user interface; and receive a selection of one or more folders for display within the second section of the multi-section graphical user interface.

15. A computer-implemented method comprising:
identifying one or more digital content items and one or more folders from a file storage structure of a content management system;
providing for display, within a first section of a multi-section graphical user interface of a client device, one or more digital-content-item icons corresponding to the one or more digital content items from the file storage structure of the content management system;
providing for display, within a second section of a multi-section graphical user interface of the client device, one or more folder icons corresponding to the one or more folders from the file storage structure of the content management system;
based on a user interaction with a plurality of digital-content-item icons:
visually moving a first particular digital-content-item icon from the first section of the multi-section graphical user interface to a first particular folder icon from the second section of the multi-section graphical user interface while preserving a first path directory location of a first folder in the file storage structure visually represented by the first particular folder icon;
visually moving a second particular digital-content-item icon from the first section of the multi-section graphical user interface to a second particular folder icon from the second section of the multi-section graphical user interface while preserving a second path directory location of a second folder in the file storage structure visually represented by the second particular folder icon, wherein the second path directory location is different from the first path directory location; and
removing the first particular digital-content-item icon and the second particular digital-content-item icon from display in the first section of the multi-section graphical user interface while preserving a first original path directory location of a first digital-content-item corresponding the first particular digital-content-item icon and a second original path directory location of a second digital-content-item corresponding to the second particular digital-content-item icon within the file storage structure of the content management system;
detecting a user selection to terminate a digital organization space corresponding to the multi-section graphical user interface; and
based on moving the first particular digital-content-item icon from the first section to the first particular folder icon from the second section and the second particular digital-content-item icon from the first section to the second particular folder icon from the second section and the user selection to terminate the digital organization space, modifying the file storage structure of the content management system to move a first digital content item corresponding to the first particular digital-content-item icon within the first path directory location of the first folder corresponding to the first particular folder icon and to move a second digital content item corresponding to the second particular digital-content-item icon within the second path directory location of the second folder corresponding to the second particular folder icon based on visual movements within the digital organization space.

16. The computer-implemented method of claim 15, further comprising automatically identifying the one or more digital content items for the first section of the multi-section graphical user interface by utilizing a machine learning model to predicts that a digital content item is misplaced within the file storage structure.

17. The computer-implemented method of claim 15, further comprising automatically identifying the one or more folders based on similarities between the one or more digital content items and digital content items corresponding to the one or more folders.

18. The computer-implemented method of claim 15, further comprising:
providing for display a reminder-generation option for generating reminders; and
receiving user input to schedule a reminder for organizing digital content items, removing digital content items, or renaming digital content items within the file storage structure.

19. The computer-implemented method of claim 15, further comprising:
determining a time for a scheduled reminder has arrived for organizing digital content items; and
based on determining the time for the scheduled reminder has arrived, causing the client device to:
automatically identify digital content items to display within the first section of the multi-section graphical user interface; and
automatically identify folders to display within the second section of the multi-section graphical user interface.

20. The computer-implemented method of claim 15, wherein:
the one or more digital-content-item icons are associated with digital content items from different folder locations of the file storage structure; and
the one or more folder icons are associated with digital folders from different folder locations of the file storage structure.

* * * * *